US012807747B2

(12) United States Patent
Takeshima et al.

(10) Patent No.: US 12,807,747 B2
(45) Date of Patent: Nov. 24, 2026

(54) WATER DISPERSION COMPOSITION, METHOD FOR PRODUCING THE WATER DISPERSION COMPOSITION, AND ETHYLENE ALPHA-OLEFIN COPOLYMER ACID-MODIFIED SUBSTANCE

(71) Applicant: MITSUI CHEMICALS, INC., Tokyo (JP)

(72) Inventors: Atsushi Takeshima, Hatsukaichi (JP); Takurou Watanabe, Kishiwada (JP); Terufumi Suzuki, Ichihara (JP); Shota Abe, Chiba (JP); Kuniaki Kawabe, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 610 days.

(21) Appl. No.: 18/272,698

(22) PCT Filed: Jan. 18, 2022

(86) PCT No.: PCT/JP2022/001501

§ 371 (c)(1),
(2) Date: Jul. 17, 2023

(87) PCT Pub. No.: WO2022/154126

PCT Pub. Date: Jul. 21, 2022

(65) Prior Publication Data

US 2024/0101737 A1 Mar. 28, 2024

(30) Foreign Application Priority Data

Jan. 18, 2021 (JP) ................................. 2021-005839

(51) Int. Cl.
*C08F 210/16* (2006.01)
*C08J 3/05* (2006.01)

(52) U.S. Cl.
CPC ............... *C08F 210/16* (2013.01); *C08J 3/05* (2013.01); *C08J 2323/30* (2013.01)

(58) Field of Classification Search
CPC .. C08F 210/16; C08F 4/65908; C08F 255/02; C08J 3/05; C08J 2323/30; C08L 2205/025; C08L 2205/03; C08L 51/06; C08L 23/26; C09D 151/06
See application file for complete search history.

(56) References Cited

U.S. PATENT DOCUMENTS

| | | | |
|---|---|---|---|
| 6,833,045 | B1 | 12/2004 | Tokita et al. |
| 2018/0273662 | A1 | 9/2018 | Harada et al. |

FOREIGN PATENT DOCUMENTS

| | | | |
|---|---|---|---|
| JP | S64-053727 A | 3/1989 | |
| JP | 2015-052124 A | 3/2015 | |
| JP | 2016-088965 A | 5/2016 | |
| JP | 2016-102157 A | 6/2016 | |
| WO | WO-2009/045731 A2 | 4/2009 | |

*Primary Examiner* — Catherine S Branch
*Assistant Examiner* — Olga Lucia Donahue
(74) *Attorney, Agent, or Firm* — Foley & Lardner LLP

(57) ABSTRACT

A water dispersion composition containing an ethylene·α-olefin copolymer acid-modified product (B) in a range of 0.01 to 50% by mass, wherein the ethylene·α-olefin copolymer acid-modified product (B) is an acid-modified product of an ethylene·α-olefin copolymer (A) satisfying requirements (A1) to (A6) as specified herein and also satisfies the requirements (B1) to (B5) as specified herein.

7 Claims, No Drawings

WATER DISPERSION COMPOSITION, METHOD FOR PRODUCING THE WATER DISPERSION COMPOSITION, AND ETHYLENE ALPHA-OLEFIN COPOLYMER ACID-MODIFIED SUBSTANCE

CROSS-REFERENCE TO RELATED APPLICATIONS

The present application claims priority under 35 U.S.C. § 371 to International Patent Application No. PCT/JP2022/001501, filed Jan. 18, 2022, which claims priority to and the benefit of Japanese Patent Application No. 2021-005839, filed Jan. 18, 2021. The contents of these applications are hereby incorporated by reference in their entireties.

TECHNICAL FIELD

The present invention relates to a water dispersion composition in which dispersibility is good, a method for producing the water dispersion composition, and an ethylene·α-olefin copolymer acid-modified substance.

BACKGROUND ART

Conventionally, in various industrial fields, it is known that base materials such as a plastic film, a vapor deposition film, a metal foil, paper, and nonwoven fabric or a base material and another adherend are bonded to each other by heat and pressure (that is, are heat-sealed). In heat sealing, a method has been usually used in which base materials or a base material and an adherend are directly bonded to each other. In addition, in order to improve heat sealability between the base material and the adherend, a method has also been used in which a heat sealing agent (adhesive) layer is formed in advance on a base material, and the base materials or the base material and another adherend are bonded to each other with the adhesive layer interposed therebetween.

As an adhesive used in such a heat sealing agent, for example, an aqueous dispersion liquid containing at least one highly crystalline polyolefin having a crystallinity of more than 50%, at least one dispersant, and water has been proposed. (see, for example, Patent Document 1)

The present applicant found that in a water dispersion composition containing at least one selected from a specific ethylene·α-olefin copolymer (A) and an acid-modified product (B) of the copolymer (A) in a range of 0.01 to 50% by mass, dispersibility of the acid-modified product (B) was improved, and proposed such a water dispersion composition as JP2016-102157A (Patent Document 2). Nevertheless, depending on the application, a water dispersion is required in which dispersibility is even better and which is excellent in coatability to, for example, a base material.

CITATION LIST

Patent Documents

Patent Document 1: JP2015-52124A
Patent Document 2: JP2016-102157A

SUMMARY OF INVENTION

Technical Problem

An object of the present invention is to obtain a water dispersion in which dispersibility of an ethylene·α-olefin copolymer acid-modified substance is further improved and which is excellent in coatability to, for example, a base material.

Solution to Problem

As a result of various studies to obtain a water dispersion in which dispersibility is further improved, the present inventors have found that the above object can be achieved by using, as an ethylene·α-olefin copolymer forming a water dispersion, an acid-modified substance modified with an unsaturated carboxylic acid or a derivative thereof, and among such an acid-modified substance, an acid-modified substance having a high modification rate, in other words, having a low content of unreacted molecules.

That is, the present invention relates to a water dispersion composition comprising an ethylene α-olefin copolymer acid-modified substance (B) in a range of 0.01 to 50% by mass, wherein the ethylene·α-olefin copolymer acid-modified product (B) is an acid-modified substance of an ethylene·α-olefin copolymer (A) satisfying the following (A1) to (A6), and satisfies the following (B1) to (B5):

(A1) having a content of ethylene units of in a range of 30 to 85 mol %;

(A2) having a kinematic viscosity at 100° C. of in a range of 10 to 5,000 $mm^2/s$;

(A3) having a weight-average molecular weight, as measured by gel permeation chromatography (GPC) and calculated in terms of polystyrene, being in a range of 1,000 to 50,000;

(A4) having a molecular weight distribution (Mw/Mn) for molecular weight measured by gel permeation chromatography (GPC) and calculated in terms of polystyrene, being 2.5 or less;

(A5) having a B-value represented by the following formula [1] of 1.1 or more.

[Math. 1]

$$B = \frac{P_{OE}}{2P_O \cdot P_E} \qquad [1]$$

wherein $P_E$ represents a molar fraction of ethylene units, $P_O$ represents a molar fraction of α-olefin units, and $P_{OE}$ represents a molar fraction of ethylene·α-olefin chains in all dyad chains;

(A6) having an amount of unsaturated bonds, as measured by $^1$H-NMR, being less than 0.5 per 1000 carbon atoms;

(B1) having an acid value of in a range of 1 to 300 mgKOH/g;

(B2) having an apparent viscosity at 150° C. of in a range of 1 to 1,000 cPs;

(B3) having a weight-average molecular weight, as measured by gel permeation chromatography (GPC) and calculated in terms of polystyrene, being in a range of 1,000 to 50,000;

(B4) having a molecular weight distribution (Mw/Mn) for molecular weight measured by gel permeation chromatography (GPC) and calculated in terms of polystyrene, being 2.5 or less;

(B5) having a weight fraction of unreacted molecules, as measured by high performance liquid chromatography (HPLC), being 59% or less.

Advantageous Effects of Invention

In the water dispersion of the present invention, the particle size of the ethylene·α-olefin copolymer acid-modified substance (B) forming the water dispersion is reduced and dispersibility is further improved. Consequently, long-term stability is improved due to difficulty in separation of the emulsion, adhesion to a base material is improved due to increased interaction between particles and increased viscosity, and the coatability to, for example, a base material is also improved due to suppression of liquid dripping.

DESCRIPTION OF EMBODIMENTS

Hereinafter, a water dispersion composition of the present invention, a method for producing the water dispersion composition, and an ethylene·α-olefin copolymer acid-modified substance will be described in detail.

The water dispersion composition of the present invention contains an acid-modified substance (B) of an ethylene·α-olefin copolymer (A) described below. Hereafter, these are also referred to as "component (B)" and "component (A)," respectively.

In the present specification, a structural unit derived from a monomer is also referred to as a "monomer unit".

[Ethylene·α-Olefin Copolymer (A)]

The ethylene·α-olefin copolymer (A), which is the base of the ethylene·α-olefin copolymer acid-modified substance (B) forming the water dispersion of the present invention, satisfies the following (A1) to (A6).

(A1) Having a content of ethylene units of in a range of 30 to 85 mol %.

The content of ethylene units in the component (A) is in a range of 30 to 85 mol %, preferably in a range of 40 to 70 mol %, particularly preferably in a range of 45 to 65 mol %. When the content is excessively out of the above range, crystallinity is generated in the copolymer, and as a result, the viscosity of the copolymer increases or the copolymer becomes solid, and the dispersibility of the copolymer in water is deteriorated. Further, when the content is more than 85 mol %, the amount of tertiary carbon, which is likely to cause a decomposition reaction, in the main chain is reduced, and when the water dispersion composition of the present invention is used as, for example, a mold release agent for die casting, an oxidized and degraded product generated by heat is likely to be deposited on the surface of a mold, which is not preferable.

The content of the ethylene units in the component (A) can be measured by $^{13}$C-NMR according to the method described in "Handbook of Polymer Analysis" (Asakura Publishing Co., Ltd., Published in 2008, the first edition, p. 184-211). It is also possible to measure a sample obtained by this method as a known sample using Fourier transform infrared spectroscopy (FT-IR). The total content of all monomer units is 100 mol %.

(A2) Having a kinematic viscosity at 100° C. of in a range of 10 to 5,000 mm$^2$/s.

The kinematic viscosity of the component (A) is the value measured by the method described in JIS K2283. The kinematic viscosity of component (A) at 100° C. is in a range of 10 to 5,000 mm$^2$/s, preferably 10 to 2,500 mm$^2$/s, more preferably 15 to 2,500 mm$^2$/s, particularly preferably 15 to 500 mm$^2$/s. When the kinematic viscosity is excessively lower than the above range, there are cases that, due to a large amount of readily volatile components, the component (A) is likely to catch fire and the storage stability is deteriorated, cases that the evaporation loss is increased in the water dispersion, and cases that the amount of high molecular weight components, which are likely to adhere to a mold, is decreased when, for example, the water dispersion composition is used as a mold release agent for die casting, which is not preferable. When the kinematic viscosity is excessively higher than the above range, the viscosity of the copolymer increases, which makes the copolymer difficult to uniformly disperse in water.

(A3) Having a weight-average molecular weight being in a range of 1,000 to 50,000.

The weight-average molecular weight (MW) of the component (A) is a value measured by gel permeation chromatography (GPC) according to the method described below and obtained in terms of standard polystyrene. The weight-average molecular weight (Mw) of the component (A) is in a range of 1,000 to 50,000, preferably 1,500 to 30,000, more preferably 1,500 to 20,000, and particularly preferably 1,500 to 7,000. When Mw is excessively lower than the above range, there are cases that, due to a large amount of readily volatile components, the component (A) is likely to catch fire and the storage stability is deteriorated, cases that the evaporation loss is increased the water dispersion, and cases that the amount of high molecular weight components, which are likely to adhere to a mold, is decreased when, for example, the water dispersion composition is used as a mold release agent for die casting, which is not preferable. When Mw is excessively higher than the above range, the viscosity of the copolymer increases, which makes the copolymer difficult to uniformly disperse in water.

(A4) Having a molecular weight distribution being 2.5 or less.

The molecular weight distribution of the component (A) is calculated as a ratio (Mw/Mn) of a weight-average molecular weight (Mw) and a number-average molecular weight (Mn) measured by gel permeation chromatography (GPC) according to the method described below and calculated in terms of standard polystyrene. The Mw/Mn of the component (A) is 2.5 or less, preferably 2.3 or less, and more preferably 2.0 or less. The molecular weight distribution excessively exceeding the above range means that the copolymer contains a large amount of low molecular weight components and high molecular weight components. When the copolymer contains a large amount of low molecular weight components, there are cases that, due to a large amount of readily volatile components, the component (A) is likely to catch fire and the storage stability is deteriorated, and cases that, the evaporation loss is increased in the water dispersion. When the copolymer contains a large amount of high molecular weight components, the viscosity of the copolymer increases, which makes the copolymer difficult to uniformly disperse in water.

(A5) Having a B-value of 1.1 or more.

The B-value of the component (A) represented by the following formula [1] is 1.1 or more, and preferably 1.2 or more. The upper limit value of the B-value is not particularly limited, but is usually 2.0 or less.

[Math. 1]

$$B = \frac{P_{OE}}{2P_O \cdot P_E} \quad [1]$$

In the formula [1], $P_E$ represents a molar fraction of ethylene units, $P_O$ represents a molar fraction of α-olefin units, and $P_{OE}$ represents a molar fraction of ethylene·α-olefin chains in all dyad chains.

The B-value is an indicator of randomness of copolymer monomer chain distribution in the copolymer, and the values of $P_E$, $P_O$ and $P_{OE}$ in the above formula [1] can be determined by measuring $^{13}$C-NMR spectrum based on publicly known documents such as J. C. Randall [Macromolecules, 15, 353 (1982)], J. Ray [Macromolecules, 10, 773 (1977)], and "Handbook of Polymer Analysis" (Asakura Publishing Co., Ltd., Published in 2008, the first edition, p. 184-211).

A larger B-value indicates that the copolymer has a smaller number of chain structures of ethylene units and α-olefin units, has a uniform distribution of ethylene units and α-olefin units, and has a narrow composition distribution. As a result, as the B-value is larger, the crystallinity of the component (A) is less likely to occur, the viscosity of the component (A) does not increase, the component (A) does not become solid, and the dispersibility in water is less likely to deteriorate.

Specific measurement conditions of the B-value are as described in Examples.

(A6) Having an amount of unsaturated bonds, as measured by $^1$H-NMR, being less than 0.5 per 1000 carbon atoms.

The total number of double bonds derived from, for example, vinyls, vinylidenes, disubstituted olefins, and trisubstituted olefins (hereinafter, also referred to as "the amount of unsaturated bonds") in the molecules of the component (A), as measured by $^1$H-NMR, is less than 0.5, preferably less than 0.3, more preferably less than 0.2, and particularly preferably less than 0.1 per 1000 carbon atoms. When the amount of unsaturated bonds is within this range, the heat resistance of the component (A) is improved. Specific measurement conditions of the amount of unsaturated bonds are as described in Examples.

The component (A) preferably further satisfies the following (A7).

(A7) Having no observed melting point.

The component (A) preferably has no observed melting point in differential scanning calorimetry (DSC). No observed melting point (Tm) means that the heat of fusion (ΔH) (unit: J/g) measured by differential scanning calorimetry (DSC) is not substantially measured. The heat of fusion (ΔH) not substantially measured means that no peaks are observed in measurement with a differential scanning calorimetry (DSC) or the heat of fusion observed is 1 J/g or less.

The melting point (Tm) and the heat of fusion (ΔH) of the component (A) are determined by analyzing a DSC curve obtained by cooling to −100° C. and then rising the temperature to 150° C. at a rate of temperature rise of 10° C./min in measurement with a differential scanning calorimetry (DSC), with reference to JIS K7121. When no melting point is observed, it means that the crystallinity of the component (A) is low as a result, and the viscosity of the component (A) does not increase or become a solid, and the dispersibility in water is excellent.

Examples of the α-olefin forming the component (A) include linear or branched α-olefins having 3 to 20 carbon atoms such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene.

The α-olefin is preferably a linear or branched α-olefin having 3 to 10 carbon atoms, more preferably at least one selected from propylene, 1-butene, 1-hexene, and 1-octene, and most preferably propylene from the viewpoint of the fluidity of the water dispersion composition using the obtained copolymer.

The α-olefins can be used singly or in combination of two or more thereof.

The component (A) can also be obtained by carrying out the polymerization in the presence of at least one other monomer selected from a polar group-containing monomer, an aromatic vinyl compound, an alicyclic vinyl compound and a cyclic olefin in the reaction system together with an α-olefin. The other monomer can be used in an amount of, for example, 20 parts by mass or less, preferably 10 parts by mass or less, based on 100 parts by mass of the total of ethylene and the α-olefin.

Examples of the polar group-containing monomers include α,β-unsaturated carboxylic acids such as acrylic acid, methacrylic acid, fumaric acid and maleic anhydride; metal salts of these acids such as sodium salts; α,β-unsaturated carboxylate esters such as methyl acrylate, ethyl acrylate, n-propyl acrylate, methyl methacrylate and ethyl methacrylate; vinyl esters such as vinyl acetate and vinyl propionate; and unsaturated glycidyls such as glycidyl acrylate and glycidyl methacrylate.

Examples of the aromatic vinyl compounds include styrene, o-methylstyrene, m-methylstyrene, p-methylstyrene, o,p-dimethylstyrene, methoxystyrene, vinylbenzoic acid, methyl vinylbenzoate, vinylbenzyl acetate, hydroxystyrene, p-chlorostyrene, divinylbenzene, a-methylstyrene and allylbenzene.

Examples of the alicyclic vinyl compound include vinylcyclohexane.

Examples of the cyclicolefins include those cyclicolefins having 3 to 30, preferably 3 to 20 carbon atoms such as cyclopentene, cycloheptene, norbornene, 5-methyl-2-norbornene and tetracyclododecene.

The component (A) may be used singly or in combination of two or more thereof. For example, two or more kinds of the components (A) having different molecular weights and/or different monomer compositions may be used in combination.

The method for producing the component (A) is not particularly limited, and examples thereof include a method using a vanadium catalyst comprising a vanadium compound and an organoaluminum compound as described in JP1990-1163B and JP1990-7998B. Further, as a method for producing a copolymer with high polymerization activity, a method using a metallocene-based catalyst containing a metallocene compound (for example, zirconocene) and an organoaluminumoxy compound (for example, aluminoxane), as described in JP61-221207A, JP1995-121969B, JP2796376B, and JP4367687B may be used, and the method using a metallocene-based catalyst is more preferred because the chlorine content of the obtained copolymer and the 2,1-insertion amount of propylene can be reduced.

In the method using a vanadium catalyst, a trace amount of chlorine may remain in the obtained component (A) because more chlorine compounds are used for the cocatalyst as compared with the method using a metallocene catalyst.

On the other hand, in the metallocene-based catalyst method, substantially no chlorine is allowed to remain, so there is no need to consider the possibility that the water dispersion promotes corrosion of metal parts such as storage containers. The chlorine content in the copolymer is preferably 100 wtppm or less, more preferably 50 wtppm or less, further preferably 20 wtppm or less, and particularly preferably 5 wtppm or less. The chlorine content can be quantified by various known methods. Specific measurement methods in the present invention are as described in Examples.

Further, the reduction of the 2,1-insertion amount of propylene in the component (A) makes it possible to further reduce the number of ethylene chains in the copolymer molecule and to suppress the intramolecular crystallinity of ethylene, and therefore such a copolymer is excellent in dispersibility in water. The 2,1-insertion amount of propylene is determined by analysis of $^{13}C$-NMR measurement according to the method described in JP H7-145212A, and is preferably less than 1%, more preferably 0 to 0.5%, and further preferably 0 to 0.1%. It is particularly preferable that no peak is observed in a range of 15.0 to 17.5 ppm.

The component (A) favorable in balance performance among molecular weight control, molecular weight distribution, non-crystallinity and B-value is obtained particularly by using the following method.

The component (A) can be produced by copolymerizing ethylene and an α-olefin in the presence of an olefin polymerization catalyst including a bridged metallocene compound (a) represented by the following general formula [I], and at least one compound (b) selected from the group consisting of an organometal compound (b-1), an organoaluminumoxy compound (b-2), and a compound (b-3) that reacts with the bridged metallocene compound (a) to form an ion pair.

[Formula 1]

[I]

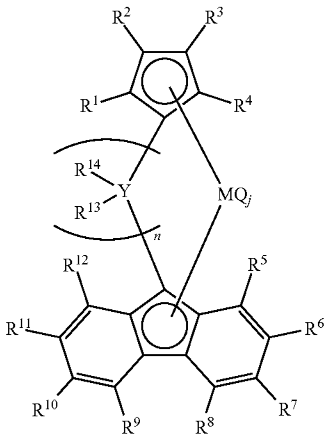

<Bridged Metallocene Compound (a)>

The bridged metallocene compound (a) is represented by the formula [I].

Y, M, $R^1$ to $R^{14}$, Q, n and j in the formula [I] are described below.

(Y, M, $R^1$ to $R^{14}$, Q, n and j)

Y is a Group XIV atom, and is, for example, a carbon atom, a silicon atom, a germanium atom or a tin atom, and is preferably a carbon atom or a silicon atom, more preferably a carbon atom.

M is a titanium atom, a zirconium atom or a hafnium atom, preferably a zirconium atom.

$R^1$ to $R^{12}$ are each an atom or a substituent selected from a hydrogen atom, a hydrocarbon group having 1 to 20 carbon atoms, a silicon-containing group, a nitrogen-containing group, an oxygen-containing group, a halogen atom and a halogen-containing group, and may be the same as or different from one another. Adjacent substituents among $R^1$ to $R^{12}$ may be bonded to each other to form a ring, or may not be bonded to each other.

Examples of the hydrocarbon group having 1 to 20 carbon atoms include alkyl groups having 1 to 20 carbon atoms, cyclic saturated hydrocarbon groups having 3 to 20 carbon atoms, linear unsaturated hydrocarbon groups having 2 to 20 carbon atoms, and cyclic unsaturated hydrocarbon groups having 3 to 20 carbon atoms.

Examples of the alkyl groups having 1 to 20 carbon atoms include straight saturated hydrocarbon groups such as a methyl group, an ethyl group, an n-propyl group, an n-butyl group, an n-pentyl group, an n-hexyl group, an n-heptyl group, an n-octyl group, an n-nonyl group and an n-decanyl group, and branched saturated hydrocarbon groups such as an isopropyl group, an isobutyl group, a s-butyl group, a t-butyl group, a t-amyl group, a neopentyl group, a 3-methylpentyl group, a 1,1-diethylpropyl group, a 1,1-dimethylbutyl group, a 1-methyl-1-propylbutyl group, a 1,1-dipropylbutyl group, a 1,1-dimethyl-2-methylpropyl group, a 1-methyl-1-isopropyl-2-methylpropyl group and a cyclopropylmethyl group. The number of carbon atoms in such an alkyl group is preferably 1 to 6.

Examples of the cyclic saturated hydrocarbon group having 3 to 20 carbon atoms include unsubstituted cyclic saturated hydrocarbon groups such as a cyclopropyl group, a cyclobutyl group, a cyclopentyl group, a cyclohexyl group, a cycloheptyl group, a cyclooctyl group, a norbornyl group, a 1-adamantyl group and a 2-adamantyl group, and unsubstituted cyclic saturated hydrocarbon groups in which one or more hydrogen atoms therein are replaced with a hydrocarbon group having 1 to 17 carbon atoms, such as a 3-methylcyclopentyl group, a 3-methylcyclohexyl group, a 4-methylcyclohexyl group, a 4-cyclohexylcyclohexyl group and a 4-phenylcyclohexyl group. The number of carbon atoms in such a cyclic saturated hydrocarbon group is preferably 5 to 11.

Examples of the linear unsaturated hydrocarbon group having 2 to 20 carbon atoms include alkenyl groups such as an ethenyl group (vinyl group), a 1-propenyl group, a 2-propenyl group (allyl group) and a 1-methylethenyl group (isopropenyl group), and alkynyl groups such as an ethynyl group, a 1-propynyl group and a 2-propynyl group (propargyl group). The number of carbon atoms in such a linear unsaturated hydrocarbon group is preferably 2 to 4.

Examples of the cyclic unsaturated hydrocarbon having 3 to 20 carbon atoms include unsubstituted cyclic unsaturated hydrocarbon groups such as a cyclopentadienyl group, a norbornenyl group, a phenyl group, a naphthyl group, an indenyl group, an azulenyl group, a phenanthryl group and an anthracenyl group, unsubstituted cyclic unsaturated hydrocarbon groups in which one or more hydrogen atoms therein are replaced with a hydrocarbon having 1 to 15 carbon atoms, such as a 3-methylphenyl group (m-tolyl group), a 4-methylphenyl group (p-tolyl group), a 4-ethylphenyl group, a 4-t-butylphenyl group, a 4-cyclohexylphenyl group, a biphenylyl group, a 3,4-dimethylphenyl group, a 3,5-dimethylphenyl group and a 2,4,6-trimethylphenyl group (mesityl group), and linear saturated hydrocarbon groups or branched saturated hydrocarbon groups in which one or more hydrogen atoms are replaced with a unsubstituted or substituted cyclic unsaturated hydrocarbon having 3 to 19 carbon atoms, such as a benzyl group and a cumyl group. The number of carbon atoms in such a cyclic unsaturated hydrocarbon group is preferably 6 to 10.

Examples of the silicon-containing group include hydrocarbon groups having 1 to 20 carbon atoms in which at least one carbon atom is replaced with a silicon atom, for example, alkylsilyl groups such as a trimethylsilyl group, a triethylsilyl group, a t-butyldimethylsilyl group and a triisopropylsilyl group, arylsilyl groups such as a dimethylphenylsilyl group, a methyldiphenylsilyl group and a t-butyldiphenylsilyl group, and a pentamethyldisilanyl group and a trimethylsilylmethyl group. The number of carbon atoms in such an alkylsilyl group is preferably 1 to 10, and the number of carbon atoms in such an arylsilyl group is preferably 6 to 18.

Examples of the nitrogen-containing group include an amino group, and the above hydrocarbon groups having 1 to 20 carbon atoms or silicon-containing groups, in which at least one =CH— structural unit is replaced with a nitrogen atom, at least one —$CH_2$— structural unit is replaced with a nitrogen atom to which such a hydrocarbon groups having 1 to 20 carbon atoms is bonded, at least one —$CH_3$ structural unit is replaced with a nitrogen atom to which such a hydrocarbon groups having 1 to 20 carbon atoms is bonded, or at least one —$CH_3$ structural unit is replaced with a nitrile group, such as a dimethylamino group, a diethylamino group, an N-morpholinyl group, a dimethylaminomethyl group, a cyano group, a pyrrolidinyl group, a piperidinyl group and a pyridinyl group, and a nitro group. The nitrogen-containing group is preferably a dimethylamino group, an N-morpholinyl group.

Examples of the oxygen-containing group include a hydroxyl group, the above hydrocarbon groups having 1 to 20 carbon atoms, silicon-containing groups or nitrogen-containing groups, in which at least one —$CH_2$— structural unit is replaced with an oxygen atom or a carbonyl group or at least one —$CH_3$ structural unit is replaced with an oxygen atom to which such a hydrocarbon group having 1 to 20 carbon atoms is bonded, such as a methoxy group, an ethoxy group, a t-butoxy group, a phenoxy group, a trimethylsiloxy group, a methoxyethoxy group, a hydroxymethyl group, a methoxymethyl group, an ethoxymethyl group, a t-butoxymethyl group, a 1-hydroxyethyl group, a 1-methoxyethyl group, a 1-ethoxyethyl group, a 2-hydroxyethyl group, a 2-methoxyethyl group, a 2-ethoxyethyl group, an n-2-oxabutylene group, an n-2-oxapentylene group, an n-3-oxapentylene group, an aldehyde group, an acetyl group, a propionyl group, a benzoyl group, a trimethylsilylcarbonyl group, a carbamoyl group, a methylaminocarbonyl group, a carboxy group, a methoxycarbonyl group, a carboxymethyl group, an ethocarboxymethyl group, a carbamoylmethyl group, a furanyl group and a pyranyl group. The oxygen-containing group is preferably a methoxy group.

Examples of the halogen atom include Group XVII atoms such as fluorine, chlorine, bromine and iodine.

Examples of the halogen-containing group include the above hydrocarbon groups having 1 to 20 carbon atoms, silicon-containing groups, nitrogen-containing groups or oxygen-containing groups, in which at least one hydrogen atom is substituted with a halogen atom, such as a trifluoromethyl group, a tribromomethyl group, a pentafluoroethyl group and a pentafluorophenyl group.

Adjacent substituents among $R^1$ to $R^{12}$ may be bonded to each other to form, for example, an alkylene group having 1 to 20 carbon atoms, or an arylene group having 6 to 20 carbon atoms, thereby forming a ring together with ring carbons to which $R^1$ to $R^{12}$ are bonded.

Examples of the alkylene group having 1 to 20 carbon atoms include a methylene group, an ethylene group, a dimethylmethylene group (isopropylidene group), an ethylmethylene group, a methylethylene group and an n-propylene group. The number of carbon atoms in such an alkylene group is preferably 1 to 6.

Examples of the arylene group having 6 to 20 carbon atoms include an o-phenylene group, an m-phenylene group, a p-phenylene group and a 4,4'-biphenylylene group. The number of carbon atoms in such an arylene group is preferably 6 to 12.

Qs are selected from a halogen atom, a hydrocarbon group having 1 to 20 carbon atoms, an anion ligand, and a neutral ligand capable of coordinating to a lone electron pair, the Qs being the same or in combination of different members.

The details of the halogen atom and the hydrocarbon group having 1 to 20 carbon atoms are as described above. When Q is the halogen atom, Q is preferably a chlorine atom. When Q is the hydrocarbon group having 1 to 20 carbon atoms, the number of carbon atoms in the hydrocarbon group is preferably 1 to 7.

Examples of the anion ligand include alkoxy groups such as a methoxy group, a t-butoxy group and a phenoxy group, carboxylate groups such as acetate and benzoate, and sulfonate groups such as methylate and tosylate.

Examples of the neutral ligand capable of coordinating to a lone electron pair include phosphororganic compounds such as trimethylphosphine, triethylphosphine, triphenylphosphine and diphenylmethylphosphine, and ether compounds such as tetrahydrofuran, diethyl ether, dioxane and 1,2-dimethoxyethane.

j is an integer of 1 to 4, and is preferably 2.

n is an integer of 1 to 4, preferably 1 or 2, further preferably 1.

$R^{13}$ and $R^{14}$ are each an atom or a substituent selected from a hydrogen atom, a hydrocarbon group having 1 to 20 carbon atoms (provided that the following aryl group and substituted aryl group are excluded), an aryl group, a substituted aryl group, a silicon-containing group, a nitrogen-containing group, an oxygen-containing group, a halogen atom and a halogen-containing group, and may be the same as or different from each other. $R^{13}$ and $R^{14}$ may be bonded to each other to form a ring, or may not be bonded to each other.

The details of the hydrocarbon group having 1 to 20 carbon atoms, the silicon-containing group, the nitrogen-containing group, the oxygen-containing group, the halogen atom and the halogen-containing group are as described above.

Examples of the aryl group are partially overlapped with examples of the cyclic unsaturated hydrocarbon group having 3 to 20 carbon atoms, and include aromatic compound-derived substituents such as a phenyl group, a 1-naphthyl group, a 2-naphthyl group, an anthracenyl group, a phenanthrenyl group, a tetracenyl group, a chrysenyl group, a pyrenyl group, an indenyl group, an azulenyl group, a pyrrolyl group, a pyridyl group, a furanyl group and a thiophenyl group. The aryl group is preferably a phenyl group or a 2-naphthyl group.

Examples of the aromatic compound include aromatic hydrocarbon and heterocyclic aromatic compounds, such as benzene, naphthalene, anthracene, phenanthrene, tetracene, chrysene, pyrene, indene, azulene, pyrrole, pyridine, furan and thiophene.

Examples of such a substituted aryl group are partially overlapped with examples of the cyclic unsaturated hydrocarbon having 3 to 20 carbon atoms, and include groups, in which one or more hydrogen atoms in the aryl group are each substituted with at least one substituent selected from a hydrocarbon having 1 to 20 carbon atoms (provided that aryl group is excluded), an aryl group, a silicon-containing group, a nitrogen-containing group, an oxygen-containing group, a halogen atom and a halogen-containing group, and specifically include a 3-methylphenyl group (m-tolyl group), a 4-methylphenyl group (p-tolyl group), a 3-ethylphenyl group, a 4-ethylphenyl group, a 3,4-dimethylphenyl group, a 3,5-dimethylphenyl group, a biphenylyl group, a 4-(trimethylsilyl)phenyl group, a 4-aminophenyl group, a 4-(dimethylamino)phenyl group, a 4-(diethylamino)phenyl group, a 4-morpholinylphenyl group, a 4-methoxyphenyl group, a 4-ethoxyphenyl group, a 4-phenoxyphenyl group, a 3,4-dimethoxyphenyl group, a 3,5-dimethoxyphenyl group, a 3-methyl-4-methoxyphenyl group, a 3,5-dimethyl-4-methoxyphenyl group, a 3-(trifluoromethyl)phenyl group, a 4-(trifluoromethyl)phenyl group, a 3-chlorophenyl group, a 4-chlorophenyl group, a 3-fluorophenyl group, a 4-fluorophenyl group, a 5-methylnaphthyl group and a 2-(6-methyl) pyridyl group.

$R^{13}$ and $R^{14}$ may be bonded to each other to form, for example, an alkylene group having 1 to 20 carbon atoms, or an arylene group having 6 to 20 carbon atoms, thereby forming a ring together with Y to which $R^{13}$ and $R^{14}$ are bonded. Specific examples of the alkylene group and the arylene group are as described above.

In the bridged metallocene compound (a) represented by the formula [I], n is preferably 1. The bridged metallocene compound is hereinafter also referred to as "bridged metallocene compound (a-1)".

The bridged metallocene compound (a-1) has advantages in that the production process is simplified, the production cost is reduced, and the production cost of the ethylene·α-olefin copolymer (A) is reduced by using the bridged metallocene compound (a-1), as compared with a compound in which n in the formula [I] is an integer of 2 to 4.

In the bridged metallocene compound (a-1), all of $R^1$, $R^2$, $R^3$ and $R^4$ are preferably hydrogen atoms. The bridged metallocene compound is hereinafter also referred to as "bridged metallocene compound (a-2)".

The bridged metallocene compound (a-2) has advantages in that the production process is simplified, the production cost is reduced, and the production cost of the ethylene·α-olefin copolymer (A) is reduced by using the bridged metallocene compound (a-2), as compared with a compound in which any one or more of $R^1$, $R^2$, $R^3$ and $R^4$ in the formula [I] are substituted with a substituent other than a hydrogen atom. Further, although it is generally known that high temperature polymerization reduces the randomness of ethylene·α-olefin copolymer (A), when ethylene and α-olefin are copolymerized in the presence of an olefin polymerization catalyst containing the bridged metallocene compound (a-2), there is an advantage in that the randomness of the obtained ethylene·α-olefin copolymer (A) is high, even in high temperature polymerization.

In the bridged metallocene compound (a-2), any one of $R^{13}$ and $R^{14}$ is preferably an aryl group or a substituted aryl group. The bridged metallocene compound is hereinafter also referred to as "bridged metallocene compound (a-3)". The bridged metallocene compound (a-3) has advantages in that the amount of double bonds in the produced ethylene·α-olefin copolymer (A) is small, as compared with the case where both $R^{13}$ and $R^{14}$ are substituents other than an aryl group and a substituted aryl group.

In the bridged metallocene compound (a-3), it is further preferable that any one of $R^{13}$ and $R^{14}$ is an aryl group or a substituted aryl group and the other is an alkyl group having 1 to 20 carbon atoms, and it is particularly preferable that any one of $R^{13}$ and $R^{14}$ is an aryl group or a substituted aryl group and the other is a methyl group. The bridged metallocene compound is hereinafter also referred to as "bridged metallocene compound (a-4)". The bridged metallocene compound (a-4) has advantages in that the balance between the amount of double bonds in the produced ethylene·α-olefin copolymer (A) and the polymerization activity is excellent and the production cost of the ethylene·α-olefin copolymer (A) is reduced using the bridged metallocene compound, as compared with the case where both $R^{13}$ and $R^{14}$ are aryl groups or substituted aryl groups.

In a case where the polymerization is carried out under the conditions of a certain total pressure and temperature in the polymerization instrument, an increase in the hydrogen partial pressure due to the introduction of hydrogen causes a decrease in the partial pressure of an olefin as a polymerization monomer, and particularly in a region where the hydrogen partial pressure is high, there arises a problem that the polymerization rate is decreased. Since the allowable total internal pressure of the polymerization reactor is limited by its design, when excessive introduction of hydrogen is required particularly in the production of an olefin polymer having a low molecular weight, the partial pressure of the olefin is remarkably reduced, so that the polymerization activity may be reduced. However, when the ethylene·α-olefin copolymer (A) is produced using the bridged metallocene compound (a-4), there are advantages in that the amount of hydrogen introduced into the polymerization reactor is reduced, the polymerization activity is improved, and the production cost of the ethylene·α-olefin copolymer (A) is reduced, as compared with the case of using the bridged metallocene compound (a-3).

In the bridged metallocene compound (a-4), $R^6$ and $R^{11}$ are preferably an alkyl group having 1 to 20 carbon atoms or an alkylene group having 1 to 20 carbon atoms formed by bonding adjacent substituents to each other. The bridged metallocene compound is hereinafter also referred to as "bridged metallocene compound (a-5)". The bridged metallocene compound (a-5) has advantages in that the production process is simplified, the production cost is reduced, and the production cost of the ethylene·α-olefin copolymer (A) is reduced by using the bridged metallocene compound (a-5), as compared with a compound in which $R^6$ and $R^{11}$ are substituted with substituents other than an alkyl group having 1 to 20 carbon atoms and an alkylene group having 1 to 20 carbon atoms.

In the bridged metallocene compounds (a), (a-1), (a-2), (a-3), (a-4), and (a-5), M is more preferably a zirconium atom. A case where ethylene and an α-olefin are copolymerized in the presence of an olefin polymerization catalyst including the bridged metallocene compound in which M is a zirconium atom has the advantages of high polymerization activity and a reduction in production cost of the ethylene·α-olefin copolymer (A), as compared with such a case where M is a titanium atom or a hafnium atom.

Examples of the bridged metallocene compound (a) include

[dimethylmethylene (η5-cyclopentadienyl) (η5-fluorenyl)] zirconium dichloride, [dimethylmethylene(η5-cyclopentadienyl) (η5-2,7-di-t-butylfluorenyl)]zirconium dichloride, [dimethylmethylene(η5-cyclopentadienyl) (η5-3,6-di-t-butylfluorenyl)]zirconium dichloride, [dimethylmethylene (η5-cyclopentadienyl) (η5-octamethyloctahydrodibenzofluorenyl)]zirconium dichloride, [dimethylmethylene (η5-cyclopentadienyl) (η5-tetramethyloctahydrodibenzofluorenyl)]zirconium dichloride,

[cyclohexylidene(η5-cyclopentadienyl) (η5-fluorenyl)]zirconium dichloride, [cyclohexylidene(η5-cyclopentadienyl) (η5-2,7-di-t-butylfluorenyl)]zirconium dichloride, [cyclohexylidene(η5-cyclopentadienyl) (η5-3,6-di-t-butylfluorenyl)]zirconium dichloride, [cyclohexylidene (η5-cyclopentadienyl) (η5-octamethyloctahydrodibenzofluorenyl)]zirconium dichloride, [cyclohexylidene (η5-cyclopentadienyl) (η5-tetramethyloctahydrodibenzofluorenyl)]zirconium dichloride,

[diphenylmethylene(η5-cyclopentadienyl) (η5-fluorenyl)] zirconium dichloride, [diphenylmethylene(η5-cyclopentadienyl) (η5-2,7-di-t-butylfluorenyl)]zirconium dichloride, [diphenylmethylene(η5-2-methyl-4-t-butylcyclopentadienyl) (η5-2,7-di-t-butylfluorenyl)]zirconium dichloride, [diphenylmethylene(η5-cyclopentadienyl) (η5-3,6-di-t-butylfluorenyl)]zirconium dichloride, [diphenylmethylene(η5-cyclopentadienyl) (η5-octamethyloctahydrodibenzofluorenyl)]zirconium dichloride, [diphenylmethylene{η5-(2-methyl-4-1-propylcyclopentadienyl)}(η5-octamethyloctahydrodibenzofluorenyl)]zirconium dichloride, [diphenylmethylene(η5-cyclopentadienyl) (η5-tetramethyloctahydrodibenzofluorenyl)]zirconium dichloride,

[methylphenylmethylene(η5-cyclopentadienyl) (η5-fluorenyl)]zirconium dichloride, [methylphenylmethylene(η5-cyclopentadienyl) (η5-2,7-di-t-butylfluorenyl)]zirconium dichloride, [methylphenylmethylene(η5-cyclopentadienyl) (η5-3,6-di-t-butylfluorenyl)]zirconium dichloride, [methylphenylmethylene(η5-cyclopentadienyl) (η5-octamethyloctahydrodibenzofluorenyl)]zirconium dichloride, [methylphenylmethylene(η5-cyclopentadienyl) (η5-tetramethyloctahydrodibenzofluorenyl)]zirconium dichloride,

[methyl (3-methylphenyl)methylene (η5-cyclopentadienyl) (η5-fluorenyl)]zirconium dichloride, [methyl (3-methylphenyl)methylene(η5-cyclopentadienyl) (η5-2,7-di-t-butylfluorenyl)]zirconium dichloride, [methyl(3-methylphenyl)methylene(η5-cyclopentadienyl) (η5-3,6-di-t-butylfluorenyl)]zirconium dichloride, [methyl(3-methylphenyl)methylene(η5-cyclopentadienyl) (η5-octamethyloctahydrodibenzofluorenyl)]zirconium dichloride, [methyl (3-methylphenyl)methylene (η5-cyclopentadienyl) (η5-tetramethyloctahydrodibenzofluorenyl)]zirconium dichloride,

[diphenylsilylene (η5-cyclopentadienyl) (η5-fluorenyl)]zirconium dichloride, [diphenylsilylene(η5-cyclopentadienyl) (η5-2,7-di-t-butylfluorenyl)]zirconium dichloride, [diphenylsilylene(η5-cyclopentadienyl) (η5-3,6-di-t-butylfluorenyl)]zirconium dichloride, [diphenylsilylene (η5-cyclopentadienyl) (η5-octamethyloctahydrodibenzofluorenyl)]zirconium dichloride, [diphenylsilylene (η5-cyclopentadienyl) (η5-tetramethyloctahydrodibenzofluorenyl)]zirconium dichloride,

[bis(3-methylphenyl) silylene(η5-cyclopentadienyl) (η5-fluorenyl)]zirconium dichloride, [bis(3-methylphenyl)silylene(η5-cyclopentadienyl) (η5-2,7-di-t-butylfluorenyl)]zirconium dichloride, [bis(3-methylphenyl)silylene (η5-cyclopentadienyl) (η5-3,6-di-t-butylfluorenyl)] zirconium dichloride, [bis(3-methylphenyl) silylene(η5-cyclopentadienyl) (η5-octamethyloctahydrodibenzofluorenyl)]zirconium dichloride, [bis(3-methylphenyl) silylene(η5-cyclopentadienyl) (η5-tetramethyloctahydrodibenzofluorenyl)]zirconium dichloride,

[dicyclohexylsilylene (η5-cyclopentadienyl) (η5-fluorenyl)]zirconium dichloride, [dicyclohexylsilylene(η5-cyclopentadienyl) (η5-2,7-di-t-butylfluorenyl)]zirconium dichloride, [dicyclohexylsilylene(η5-cyclopentadienyl) (η5-3,6-di-t-butylfluorenyl)]zirconium dichloride, [dicyclohexylsilylene (η5-cyclopentadienyl) (η5-octamethyloctahydrodibenzofluorenyl)]zirconium dichloride, [dicyclohexylsilylene (η5-cyclopentadienyl) (η5-tetramethyloctahydrodibenzofluorenyl)]zirconium dichloride, and

[ethylene (η5-cyclopentadienyl) (η5-fluorenyl)]zirconium dichloride, [ethylene(η5-cyclopentadienyl) (η5-2,7-di-t-butylfluorenyl)]zirconium dichloride, [ethylene(η5-cyclopentadienyl) (η5-3,6-di-t-butylfluorenyl)]zirconium dichloride, [ethylene(η5-cyclopentadienyl) (η5-octamethyloctahydrodibenzofluorenyl)]zirconium dichloride, [ethylene (η5-cyclopentadienyl) (η5-tetramethyloctahydrodibenzofluorenyl)]zirconium dichloride.

Examples of the bridged metallocene compound (a) include compounds obtained by replacing the zirconium atom of these compounds with a hafnium atom or compounds obtained by replacing the chloro ligand with a methyl group, but the bridged metallocene compound (a) is not limited thereto. Herein, η5-tetramethyloctahydrodibenzofluorenyl and η5-octamethyloctahydrodibenzofluorenyl, as constituent portions of the bridged metallocene compound (a) exemplified, respectively represent a 4,4,7,7-tetramethyl-(5a,5b,11a,12,12a-η5)-1,2,3,4,7,8,9,10-octahydrodibenzo[b,H]fluorenyl group and a 1,1,4,4,7,7,10,10-octamethyl-(5a,5b,11a,12,12a-η5)-1,2,3,4,7,8,9,10-octahydrodibenzo[b,H]fluorenyl group.

<Compound (b)>

The polymerization catalyst preferably used in the present invention contains the bridged metallocene compound (a) and at least one compound (b) selected from an organometal compound (b-1), an organoaluminumoxy compound (b-2) and a compound (b-3) that reacts with the bridged metallocene compound (a) to form an ion pair.

The organometal compound (b-1) here used is specifically any of organometal compounds as described below, including Groups 1 and 2 elements and Groups 12 and 13 elements in the periodic table.

(b-1a) an Organoaluminum Compound Represented by the General Formula $R^a_mAl(OR^b)_nH_pX_q$ wherein $R^a$ and $R^b$ may be the same as or different from each other and each represent a hydrocarbon group having 1 to 15 carbon atoms, preferably 1 to 4 carbon atoms, X represents a halogen atom, m is a number of $0<m\leq3$, n is a number of $0\leq n<3$, p is a number of $0\leq p<3$, q is a number of $0\leq q<3$, and $m+n+p+q=3$ is satisfied.

Examples of such a compound include tri-n-alkylaluminums such as trimethylaluminum, triethylaluminum, tri-n-butylaluminum, tri-n-hexylaluminum and tri-n-octylaluminum, tri-branched alkylaluminums such as triisopropylaluminum, triisobutylaluminum, tri-sec-butylaluminum, tri-t-butylaluminum, tri-2-methylbutylaluminum, tri-3-methylhexylaluminum and tri-2-ethylhexylaluminum, tricycloalkylaluminums such as tricyclohexylaluminum and tricyclooctylaluminum, triarylaluminums such as triphenylaluminum and tri(4-methylphenyl)aluminum, dialkylaluminum hydrides such as diisopropylaluminum hydride and diisobutylaluminum hydride, alkenylaluminum represented by the general formula $(i\text{-}C_4H_9)_xAl_y(C_5H_{10})_z$ (wherein x, y and z are positive numbers and $z\leq2x$ is satisfied), such as isoprenylaluminum, alkylaluminum alkoxides such as isobutylaluminum methoxide and isobutylaluminum ethoxide, dialkylaluminum alkoxides such as dimethylaluminum methoxide, diethylaluminum ethoxide and dibutylaluminumbutoxide, alkylaluminum sesquialkoxides such as ethylaluminum sesquiethoxide and butylaluminum sesquibutoxide, partially alkoxylated alkylaluminum having an average composition represented by, for example, general formula $R^a_{2.5}Al(OR^b)_{0.5}$, alkylaluminum aryloxides such as diethylaluminum phenoxide and diethylaluminum(2,6-di-t-butyl-4-methylphenoxide), partially halogenated alkylaluminums including dialkylaluminum halides such as dimethylaluminum chloride, diethylaluminum chloride, dibutylaluminum chloride, diethylaluminum bromide and diisobutylaluminum chloride, alkylaluminum sesquihalides such as ethylaluminum sesquichloride, butylaluminum sesquichloride and ethylaluminum sesquibromide, and alkylaluminum dihalides such as ethylaluminum dichloride, dialkylaluminum hydrides such as diethylaluminum hydride and dibutylaluminum hydride, alkylaluminum dihydrides such as ethylaluminum dihydride and propylaluminum dihydride and other partially hydrogenated alkylaluminum, and partially alkoxylated and halogenated alkylaluminum such as ethylaluminum ethoxychloride, butylaluminum butoxychloride and ethylaluminum ethoxybromide.

A compound similar to the compound represented by the general formula $R^a_mAl(OR^b)_nH_pX_q$ can also be used, and examples thereof include an organoaluminum compound in which two or more aluminum compounds are bonded via a nitrogen atom. Specific examples of such a compound include $$(C_2H_5)_2AlN(C_2H_5)Al(C_2H_5)_2.$$

(b-1b) A complex alkylated compound represented by the general formula $M^2AlR^a_4$, including a Group I metal in the periodic table and aluminum: wherein $M^2$ represents Li, Na or K, and $R^a$ represents a hydrocarbon group having 1 to 15 carbon atoms, preferably 1 to 4 carbon atoms.

Examples of such a compound include $LiAl(C_2H_5)_4$ and $LiAl(C_7H_{15})_4$.

(b-1c) A dialkyl compound represented by the general formula $R^aR^bM^3$, including a Group II or Group XII metal in the periodic table: wherein $R^a$ and $R^b$ may be the same as or different from each other and each represent a hydrocarbon group having 1 to 15 carbon atoms, preferably 1 to 4 carbon atoms and $M^3$ is Mg, Zn or Cd.

A conventionally known aluminoxane can be used as it is, as the organoaluminum oxy compound (b-2). Specific examples include a compound represented by the following general formula [II] and a compound represented by the following general formula [III].

[Formula 2]

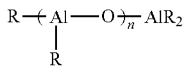

[II]

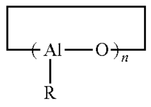

[III]

In the formulas [II] and [III], R represents a hydrocarbon group having 1 to 10 carbon atoms, and n represents an integer of 2 or more.

In particular, methylaluminoxane is utilized in which R is a methyl group and n is 3 or more, preferably 10 or more. The aluminoxanes may contain a small amount of an organoaluminum compound.

When copolymerization of ethylene and an α-olefin is performed at a high temperature in the present invention, a benzene-insoluble organoaluminum oxy compound exemplified in JP H2-78687A can also be applied. An organoaluminum oxy compound described in JP H2-167305A, or aluminoxane having two or more alkyl groups, described in JP H2-24701A and JP H3-103407A, can also be suitably utilized. The "benzene-insoluble organoaluminum oxy compound" that may be used in the present invention is a compound that usually contains 10% or less, preferably 5% or less, particularly preferably 2% or less of an Al component to be dissolved in benzene at 60° C., in terms of Al atom, and that is insoluble or hardly soluble in benzene.

Examples of the organoaluminum oxy compound (b-2) also include modified methylaluminoxane represented by the following general formula [IV].

[Formula 3]

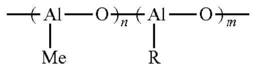

[IV]

In the formula [IV], Me represents a methyl group, R represents a hydrocarbon group having 2 to 10 carbon atoms, and m and n each independently represent an integer of 2 or more.

This modified methylaluminoxane is prepared using trimethylaluminum and an alkylaluminum other than trimethylaluminum. Such a compound is generally referred to as MMAO. Such MMAO can be prepared by a method described in US4,960,878B and US5,041,584B. A compound which is prepared using trimethylaluminum and triisobutylaluminum wherein R is an isobutyl group is also commercially available under the name of, for example, MMAO and TMAO from, for example, Tosoh Finechem Corporation. Such MMAO is an aluminoxane whose solubility with respect to various solvents and preservation stability have been improved, and is soluble in an aliphatic hydrocarbon or an alicyclic hydrocarbon, specifically unlike the compounds which are insoluble or poorly-soluble to benzene among the compounds represented by the formulas [II] and [III].

Examples of the organoaluminumoxy compound (b-2) further include an organoaluminumoxy compound represented by the following general formula [V], containing boron.

[Formula 4]

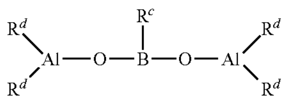

[V]

In the formula [V], $R^c$ represents a hydrocarbon group having 1 to 10 carbon atoms. $R^d$(s) may be the same as or different from one another, and each represent a hydrogen atom, a halogen atom or a hydrocarbon group having 1 to 10 carbon atoms.

Examples of the compound (b-3) (hereinafter, sometimes abbreviated as "ionized ionic compound" or simply "ionic compound") that reacts with the bridged metallocene compound (a) to form an ion pair include Lewis acids, ionic compounds, borane compounds and carborane compounds described in, for example, JP H1-501950A, JP H1-502036A, JP H3-179005A, JP H3-179006A, JP H3-207703A, JP H3-207704A and U.S. Pat. No. 5,321,106B. Examples can further include heteropoly compounds and isopoly compounds.

The ionized ionic compound preferably used in the present invention is a boron compound represented by the following general formula [VI].

[Formula 5]

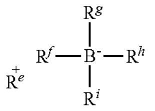

[VI]

Examples of $R^{e+}$ in the formula [VI] include $H^+$, carbenium cation, oxonium cation, ammonium cation, phosphonium cation, cycloheptyltrienyl cation, and ferrocenium cation having a transition metal. $R^f$ to $R^i$ may be the same as or different from one another, and are each a substituent selected from a hydrocarbon group having 1 to 20 carbon atoms, a silicon-containing group, a nitrogen-containing group, an oxygen-containing group, a halogen atom and a halogen-containing group, preferably a substituted aryl group.

Specific examples of the carbenium cation include tri-substituted carbenium cations such as triphenylcarbenium cation, tris(4-methylphenyl)carbenium cation and tris(3,5-dimethylphenyl)carbenium cation.

Specific examples of the ammonium cation include trialkyl-substituted ammonium cations such as trimethylammonium cation, triethylammonium cation, tri(n-propyl)ammonium cation, triisopropylammonium cation, tri(n-butyl)ammonium cation and triisobutylammonium cation, N,N-dialkylanilinium cations such as N,N-dimethylanilinium cation, N,N-diethylanilinium cation and N,N-2,4,6-pentamethylanilinium cation, and dialkylammonium cations such as diisopropylammonium cation and dicyclohexylammonium cation.

Specific examples of the phosphonium cation include triarylphosphonium cations such as triphenylphosphonium cation, tris(4-methylphenyl)phosphonium cation and tris(3,5-dimethylphenyl)phosphonium cation.

$R^{e+}$, among the above specific examples, is preferably, for example, the carbenium cation or the ammonium cation, particularly preferably triphenylcarbenium cation, N,N-dimethylanilinium cation or N,N-diethylanilinium cation.

Examples of the carbenium cation-containing compound among the ionized ionic compound preferably used in the present invention include triphenylcarbenium tetraphenylborate, triphenylcarbenium tetrakis(pentafluorophenyl)borate, triphenylcarbenium tetrakis{3,5-di-(trifluoromethyl)phenyl}borate, tris(4-methylphenyl)carbenium tetrakis(pentafluorophenyl)borate and tris(3,5-dimethylphenyl)carbenium tetrakis(pentafluorophenyl)borate.

Examples of the trialkyl-substituted ammonium cation-containing compound among the ionized ionic compound preferably used in the present invention include triethylammonium tetraphenylborate, tripropylammonium tetraphenylborate, tri(n-butyl)ammonium tetraphenylborate, trimethylammonium tetrakis(4-methylphenyl)borate, trimethylammonium tetrakis(2-methylphenyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis{4-(trifluoromethyl)phenyl}borate, tri(n-butyl)ammonium tetrakis{3,5-di(trifluoromethyl)phenyl}borate, tri(n-butyl)ammonium tetrakis(2-methylphenyl)borate, dioctadecylmethylammonium tetraphenylborate, dioctadecylmethylammonium tetrakis(4-methylphenyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis{4-(trifluoromethyl)phenyl}borate, dioctadecylmethylammonium tetrakis{3,5-di(trifluoromethyl)phenyl}borate and dioctadecylmethylammonium.

Examples of the N,N-dialkylanilinium cation-containing compound among the ionized ionic compound preferably used in the present invention include N,N-dimethylanilinium tetraphenylborate, N,N-dimethylanilinium tetrakis(pentafluorophenyl)borate, N,N-dimethylanilinium tetrakis{3,5-di(trifluoromethyl)phenyl}borate, N,N-diethylanilinium tetraphenylborate, N,N-diethylanilinium tetrakis(pentafluorophenyl)borate, N,N-diethylanilinium tetrakis{3,5-di(trifluoromethyl)phenyl}borate, N,N-2,4,6-pentamethylanilinium tetraphenylborate and N,N-2,4,6-pentamethylanilinium tetrakis(pentafluorophenyl)borate.

Examples of the dialkylammonium cation-containing compound among the ionized ionic compound preferably used in the present invention include di-n-propylammonium tetrakis(pentafluorophenyl)borate and dicyclohexylammonium tetraphenylborate.

Other ionic compounds exemplified in JP2004-51676A can also be used without any limitation.

The ionic compound (b-3) may be used singly or in combinations of two or more thereof.

The organometal compound (b-1) is preferably trimethylaluminum, triethylaluminum, or triisobutylaluminum, which are easily obtainable as commercial products. Of these, triisobutylaluminum, which is easy to handle, is particularly preferable.

The organoaluminum oxy compounds (b-2) are preferably methylaluminoxane, which is easily obtainable as a commercial product, and MMAO, which is prepared using trimethylaluminum and triisobutylaluminum. Among these, MMAO, whose solubility to various solvents and preservation stability have been improved, is particularly preferable.

The ionic compounds (b-3) are preferably triphenylcarbenium tetrakis(pentafluorophenyl)borate and N,N-dimethylanilinium tetrakis(pentafluorophenyl)borate, which are easily obtainable as commercial products and greatly contributory to improvement in polymerization activity.

As the compound (b), a combination of triisobutylaluminum and triphenylcarbenium tetrakis(pentafluorophenyl)borate, and a combination of triisobutylaluminum and N,N-dimethylanilinium tetrakis(pentafluorophenyl)borate are particularly preferable because the polymerization activity is markedly enhanced.

<Carrier (c)>

A carrier (c) may be, if necessary, used as a constituent component of the olefin polymerization catalyst in the present invention.

The carrier (c) optionally used in the present invention is an inorganic or organic compound and is a granular or fine particulate solid. In particular, the inorganic compound is preferably porous oxide, inorganic chloride, clay, clay mineral or an ion-exchangeable layered compound.

The porous oxide here used can be specifically, for example, $SiO_2$, $Al_2O_3$, MgO, ZrO, $TiO_2$, $B_2O_3$, CaO, ZnO, BaO or $ThO_2$, or a composite or a mixture including such an oxide, for example, natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ or $SiO_2$—$TiO_2$—MgO. In particular, one mainly containing $SiO_2$ and/or $Al_2O_3$ is preferable. Such porous oxide differs in properties depending on the type and the production method, and the carrier preferably used in the present invention has a particle size in a range of 0.5 to 300 μm, preferably 1.0 to 200 μm, a specific surface area in a range of 50 to 1000 $m^2/g$, preferably 100 to 700 $m^2/g$, and a pore volume in a range of 0.3 to 3.0 $cm^3/g$. Such a carrier is, if necessary, calcined at 100 to 1000° C., preferably 150 to 700° C., and then used.

The inorganic chloride used is, for example, $MgCl_2$, $MgBr_2$, $MnCl_2$ or $MnBr_2$. The inorganic chloride may be used as it is, or may be pulverized by a ball mill or a vibrating mill, and then used. Alternatively, the inorganic chloride, which is dissolved in a solvent such as an alcohol and then precipitated in the form of fine particles by a precipitating agent, may also be used.

Clay is usually constituted with clay mineral as a main component. The ion-exchangeable layered compound is a compound having a crystal structure in which surfaces configured are mutually stacked in parallel by a weak force with, for example, an ionic bond, and includes an exchangeable ion. Most clay mineral corresponds to such an ion-exchangeable layered compound. Such clay, clay mineral, and ion-exchangeable layered compound here used are not limited to natural products, and can also be artificially synthesized products. Examples of the clay, clay mineral or ion-exchangeable layered compound include clay, clay mineral, and ionic crystalline compounds having a layered crystal structure, such as a hexagonal closest packing type, an antimony type, a $CdCl_2$ type and a $CdI_2$ type. Examples of such clay and clay mineral include kaolin, bentonite, kibushi clay, gairome clay, allophane, hisingerite, pyrophyllite, mica, montmorillonite, vermiculite, chlorite rocks, palygorskite, kaolinite, nacrite, dickite and halloysite, and examples of such an ion-exchangeable layered compound include crystalline acidic salts of polyvalent metals, such as $\alpha$-$Zr(HAsO_4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HAsO_4)_2 \cdot H_2O$, $\alpha$-$Sn(HPO_4)_2 \cdot H_2O$, $\gamma$-$Zr(HPO_4)_2$, $\gamma$-$Ti(HPO_4)_2$ and $\gamma$-$Ti(NH_4PO_4)_2 \cdot H_2O$.

The clay and the clay mineral for use in the present invention are also preferably subjected to a chemical treatment. The chemical treatment here used can be any treatment such as a surface treatment for removal of impurities attached to a surface, or a treatment having an effect on the crystal structure of the clay. Specific examples of the chemical treatment include an acid treatment, an alkali treatment, a salt treatment and an organic substance treatment.

The ion-exchangeable layered compound may be a layered compound where a space between layers is enlarged by exchanging an exchangeable ion in the space between layers with another large and bulky ion by means of ion exchangeability. Such a bulky ion serves as a shore supporting a layered structure, and is usually referred to as pillar. Such introduction of another substance (guest compound) into the space between layers in the layered compound is referred to as intercalation. Examples of the guest compound include cationic inorganic compounds such as $TiCl_4$ and $ZrCl_4$, metal alkoxides (R represents, for example, a hydrocarbon group) such as $Ti(OR)_4$, $Zr(OR)_4$, $P_O(OR)_3$ and $B(OR)_3$, and metal hydroxide ions such as $[Al_{13}O_4(OH)_{24}]^{7+}$, $[Zr_4(OH)_{14}]^{2+}$ and $[Fe_3O(OCOCH_3)_6]^+$. Such a compound may be used singly or in combinations of two or more kinds thereof. In intercalation of such a compound, for example, a polymerized product obtained by hydrolytic polycondensation of a metal alkoxide (R represents, for example, a hydrocarbon group) such as $Si(OR)_4$, $Al(OR)_3$ or $Ge(OR)_4$, or a colloidal inorganic compound such as $SiO_2$ can also co-exist. Examples of the pillar include oxide generated by intercalation of the metal hydroxide ion into the space between layers and then heating and dehydration.

In particular, the clay or the clay mineral is preferable, and montmorillonite, vermiculite, pectolite, tainiolite and synthetic mica are particularly preferable.

Examples of the organic compound as the carrier (c) include a granular or fine particulate solid having a particle size in a range of 0.5 to 300 μm. Specific examples include a (co)polymer generated with as a main component a $\alpha$-olefin having 2 to 14 carbon atoms, such as ethylene, propylene, 1-butene or 4-methyl-1-pentene, or a (co)polymer generated with styrene or vinylcyclohexane as a main component, and modified products thereof.

High-temperature polymerization is made possible by a polymerization method using an olefin polymerization catalyst capable of producing an ethylene·$\alpha$-olefin copolymer (A) having high randomness. That is, by using the olefin polymerization catalyst, the decrease in the randomness of the ethylene·$\alpha$-olefin copolymer (A) that occurs during high-temperature polymerization can be suppressed. In solution polymerization, a polymerization solution including an ethylene·$\alpha$-olefin copolymer (A) produced exhibits low viscosity when the temperature is high and thus the concentration of the ethylene·$\alpha$-olefin copolymer (A) in the polymerization instrument can be increased as compared to when the polymerization takes place at a lower temperature, and as a result, the productivity per polymerization instrument is enhanced. While the copolymerization of ethylene with $\alpha$-olefins in the present invention may be carried out by any of liquid-phase polymerization processes such as solution polymerization and suspension polymerization (slurry polymerization) and gas-phase polymerization processes, solution polymerization is particularly preferable because the greatest advantage can be taken of the effects of the present invention.

The usage method and the order of addition of each component of the olefin polymerization catalyst can be arbitrarily selected. At least two or more components in the catalyst may be contacted with each other in advance.

The bridged metallocene compound (a) (hereinafter, also referred to as "component (a)") is usually used in an amount of $10^{-9}$ to $10^{-1}$ mol, preferably $10^{-8}$ to $10^{-2}$ mol per liter of a reaction volume.

The organometal compound (b-1) (hereinafter, also referred to as "component (b-1)") is used in an amount so that the molar ratio [(b-1)/M] of the component (b-1) to a transition metal atom (M) in the component (a) is usually 0.01 to 50,000, preferably 0.05 to 10,000.

The organoaluminum oxy compound (b-2) (hereinafter, also referred to as "component (b-2)") is used in an amount so that the molar ratio [(b-2)/M] of the aluminum atom in the component (b-2) to the transition metal atom (M) in the component (a) is usually 10 to 5,000, preferably 20 to 2,000.

The ionic compound (b-3) (hereinafter, also referred to as "component (b-3)") is used in an amount so that the molar ratio [(b-3)/M] of the component (b-3) to the transition metal atom (M) in the component (a) is usually 1 to 10,000, preferably 1 to 5,000.

The polymerization temperature is usually −50° C. to 300° C., preferably 30° C. to 250° C., more preferably 100° C. to 250° C., further preferably 130° C. to 200° C. In the polymerization temperature region in the above range, the higher the temperature is, the lower the solution viscosity during polymerization is and also the more easily heat of polymerization can be removed. The polymerization pressure is usually ordinary pressure to 10 MPa-gauge pressure (MPa-G) preferably ordinary pressure to 8 MPa-G.

The polymerization reaction can be carried out in any method of batchwise, semi-continuous, and continuous methods. Such polymerization can also be continuously carried out in two or more polymerization instruments different in reaction conditions.

The molecular weight of the resulting copolymer can be regulated by the changes in hydrogen concentration and polymerization temperature in a polymerization system. The molecular weight can also be regulated by the amount of the compound (b) used. In the case of addition of hydrogen, the amount of hydrogen to be added is properly about 0.001 to 5,000 NL per kg of the copolymer to be produced.

The polymerization solvent for use in a liquid phase polymerization method is usually an inert hydrocarbon solvent, and is preferably a saturated hydrocarbon having a boiling point of 50° C. to 200° C. under ordinary pressure. Specific examples of the polymerization solvent include aliphatic hydrocarbons such as propane, butane, pentane, hexane, heptane, octane, decane, dodecane and kerosene oil, and alicyclic hydrocarbons such as cyclopentane, cyclohexane and methylcyclopentane, and particularly preferably include hexane, heptane, octane, decane and cyclohexane. The α-olefin to be polymerized, by itself, can also be used as the polymerization solvent. While an aromatic hydrocarbon such as benzene, toluene or xylene, or a halogenated hydrocarbon such as ethylene chloride, chlorobenzene or dichloromethane can also be used as the polymerization solvent, use thereof is not preferable in terms of a reduction in load on the environment and in terms of minimization of the influence on human health.

The kinematic viscosity at 100° C. of the ethylene·α-olefin copolymer (A) depends on the molecular weight of the copolymer. In other words, a high molecular weight leads to a high viscosity and a low molecular weight leads to a low viscosity, and thus the kinematic viscosity at 100° C. is adjusted by the above molecular weight adjustment. In addition, a low molecular weight component in a copolymer obtained can be removed by a conventionally known method such as distillation under reduced pressure, to thereby allow for adjustment of the molecular weight distribution (Mw/Mn) of the copolymer obtained. The copolymer obtained may be further subjected to hydrogen addition (hereinafter, also referred to as "hydrogenation") by a conventionally known method. If the number of unsaturated bonds in the copolymer obtained by such hydrogenation is reduced, oxidation stability and heat resistance are enhanced.

[Ethyleneα-Olefin Copolymer Acid-Modified Substance (B)]

The ethylene·α-olefin copolymer acid-modified substance (B) forming the water dispersion of the present invention is an acid-modified substance of the ethylene·α-olefin copolymer (A). The acid-modified substance (B) is also referred to as "component (B)" or "acid-modified ethylene·α-olefin copolymer (B)".

The acid-modified substance (B) according to the present invention is a modified product obtained by modifying the ethylene·α-olefin copolymer (A) with a compound selected from unsaturated carboxylic acids and derivatives thereof, and is preferably an ethylene·α-olefin copolymer graft-modified with the compound.

Examples of the unsaturated carboxylic acid and derivatives thereof include an unsaturated carboxylic acid having 3 to 10 carbon atoms, preferably 3 to 8 carbon atoms, and a derivative of the unsaturated carboxylic acid. Examples of the derivative of the unsaturated carboxylic acid include acid anhydride, ester, amide and imide of the unsaturated carboxylic acid.

Since the component (A), which is a starting raw material of the component (B), has a small amount of unsaturated bonds as described above, it is presumed that the component (B) has a structure in which the graft component is randomly graft-bonded to the main chain skeleton of the component (A).

Examples of the unsaturated carboxylic acid include monobasic acids such as acrylic acid and methacrylic acid; and dibasic acids such as maleic acid, fumaric acid, itaconic acid, citraconic acid, and 5-norbornene-2,3-dicarboxylic acid.

Examples of the acid anhydride of the unsaturated carboxylic acid include acid anhydrides of dibasic acids such as maleic acid, itaconic acid, citraconic acid, and 5-norbornene-2,3-dicarboxylic acid.

Examples of the ester of the unsaturated carboxylic acid include esters and half esters, such as methyl acrylate, methyl methacrylate, ethyl acrylate, ethyl methacrylate, glycidyl acrylate, maleic acid monoethyl ester, maleic acid diethyl ester, fumaric acid monomethyl ester, fumaric acid dimethyl ester, itaconic acid monomethyl ester and itaconic acid diethyl ester.

Examples of the unsaturated carboxylic acid amides include acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide and fumaric acid-N,N-dibutylamide.

Examples of the unsaturated carboxylic acid imides include maleimide, N-butylmaleimide and N-phenylmaleimide.

Among these, at least one selected from maleic acid and maleic anhydride is preferred because it has a high polarity as one monomer and is less likely to form a by-product such as a homopolymer in a modification reaction using a peroxide.

The graft component may be used singly or in combination of two or more thereof.

The grafting reaction is usually carried out by adding a graft component to the ethylene·α-olefin copolymer (A) in the presence of a radical initiator such as di-t-butyl peroxide, for example, by the method described in JP61-126120A. At this time, the reaction temperature is usually 150 to 200° C., preferably 160 to 180° C., and the reaction time is usually 1 to 50 hours, preferably 1 to 10 hours. The graft component is preferably used in such an amount that the acid value of the obtained component (B) falls within the following range.

The ethylene·α-olefin copolymer acid-modified substance (B) according to the present invention is an acid-modified substance of the ethylene·α-olefin copolymer (A) satisfying the above (A1) to (A6), and satisfies the following (B1) to (B5).

(B1) Having an acid value of in a range of 1 to 300 mgKOH/g.

The acid value is used as an index of the graft amount of the graft component. The acid value of the component (B) is preferably in a range of 1 to 300 mgKOH/g, more preferably in a range of 5 to 200 mgKOH/g, and further preferably in a range of 10 to 150 mgKOH/g. When the acid value is lower than the above range, the polarity of the copolymer may decrease and the stability of the water dispersion may decrease. When the acid value is higher than the above range, hydrogen bonding between the graft components occurs, and the viscosity of the copolymer increases, and as a result, the dispersibility in water may decrease.

The acid value of component (B) can be adjusted by the graft amount of the graft component to the component (A).

For example, in order to increase the acid value of the component (B), it is preferable to increase the graft amount.

The acid value of the component (B) represents the number of milligrams of potassium hydroxide necessary for neutralization of an acid included in 1 g of the polymer, and can be measured by a method according to JIS K0070. Specifically, the acid value is as described in Examples.

(B2) Having an apparent viscosity at 150° C. of in a range of 1 to 1,000 cPs.

The apparent viscosity (Brookfield viscosity) at 150° C. of the component (B) is a value measured by the method described in JIS K7117-1. The apparent viscosity at 150° C. of the component (B) is preferably in a range of 1 to 1,000 cPs, more preferably in a range of 5 to 800 cPs, particularly preferably in a range of 5 to 90 cPs. When the apparent viscosity is in the above range, it is excellent in terms of the balance between low volatility, handling and dispersibility in water.

(B3) Having a weight-average molecular weight, as measured by gel permeation chromatography (GPC) and calculated in terms of polystyrene, being in a range of 1,000 to 50,000.

The weight-average molecular weight (Mw) of the component (B) is a value measured by gel permeation chromatography (GPC) according to the method described below and obtained in terms of standard polystyrene. The weight-average molecular weight (Mw) of the component (B) is preferably in a range of 1,000 to 50,000, more preferably 1,000 to 30,000, further preferably 1,500 to 30,000, particularly preferably 2,000 to 7,000, and most preferably 5,000 to 6,000. When Mw is excessively lower than the above range, there may be cases that, due to a large amount of readily volatile components, the component (B) is likely to catch fire and the storage stability is deteriorated, and cases that the evaporation loss is increased in the water dispersion. When Mw is excessively higher than the above range, the viscosity of the copolymer may increase, making the copolymer difficult to uniformly disperse in water.

(B4) Having a molecular weight distribution (Mw/Mn) for the molecular weight measured by gel permeation chromatography (GPC) and calculated in terms of polystyrene, being 2.5 or less.

The molecular weight distribution of the component (B) is calculated as a ratio (Mw/Mn) of a weight-average molecular weight (Mw) and a number-average molecular weight (Mn) measured by gel permeation chromatography (GPC) according to the method described below and calculated in terms of standard polystyrene. The Mw/Mn of the component (B) is preferably 2.5 or less, more preferably 2.3 or less, and further preferably 2.0 or less. The molecular weight distribution excessively exceeding the above range means that the copolymer contains a large amount of low molecular weight components and high molecular weight components. When the copolymer contains a large amount of low molecular weight components, there may be cases that, due to a large amount of readily volatile components, the component (B) is likely to catch fire and the storage stability is deteriorated, and cases that the evaporation loss is increased in the water dispersion. When the copolymer contains a large amount of high molecular weight components, the viscosity of the copolymer may increase, making the copolymer difficult to uniformly disperse in water.

(B5) Having a weight fraction of unreacted molecules, as measured by high performance liquid chromatography (HPLC), being 59% or less.

When the weight fraction of the unreacted molecules is within the above range, the proportion of the molecules of the acid-modified substance modified with an unsaturated carboxylic acid or a derivative thereof, which is excellent in affinity for water, contained in the component (B) increases, and the component (B) is easily dispersed uniformly in water, which is preferable.

The component (B) according to the present invention preferably further satisfies the following (B6).

(B6) Having a weight fraction of 20% or less, the weight fraction being a weight fraction of unreacted molecules having a molecular weight higher than the weight-average molecular weight of the acid-modified substance (B), as measured by gel permeation chromatography (GPC) and calculated in terms of polystyrene, among unreacted molecules contained in the acid-modified substance (B).

When the weight fraction of unreacted molecules having a molecular weight higher than the weight-average molecular weight of the acid-modified substance (B) is within the above range, the proportion of the unreacted molecules having a high molecular weight, which are particularly inferior in dispersibility in water, among unreacted molecules decreases, and the component (B) is easily dispersed uniformly in water, which is preferable.

The component (B) according to the present invention preferably further satisfies the following (B7).

(B7) Having no observed melting point.

The component (B) preferably has no observed melting point in differential scanning calorimetry (DSC). No observed melting point (Tm) means that the heat of fusion (ΔH) (unit: J/g) measured by differential scanning calorimetry (DSC) is not substantially measured. The heat of fusion (ΔH) not substantially measured means that no peaks are observed in measurement with a differential scanning calorimetry (DSC) or the heat of fusion observed is 1 J/g or less.

The melting point (Tm) and the heat of fusion (ΔH) of the component (B) are determined by analyzing a DSC curve obtained by cooling to −100° C. and then temperature rise to 150° C. at a rate of temperature rise of 10° C./min in measurement with a differential scanning calorimetry (DSC), with reference to JIS K7121. When no melting point is observed, it means that the crystallinity of the component (B) is low as a result, and the viscosity of the component (B) does not increase or become a solid, and the dispersibility in water is excellent.

The component (B) may be used singly or in combination of two or more thereof.

<Water Dispersion Composition>

The water dispersion composition of the present invention contains the ethylene·α-olefin copolymer acid-modified substance (B) in a range of 0.01 to 50% by mass, preferably 0.05 to 30% by mass.

The water dispersion composition of the present invention preferably has a viscosity of 15 mPa-s or more, more preferably in a range of 20 to 200 mPa-s, further preferably in a range of 30 to 200 mPa-s, particularly preferably in a range of 60 to 200 mPa-s, and most preferably in a range of 100 to 200 mPa-s. When the viscosity of the water dispersion composition is in such a range, the water dispersion composition is excellent in spreading on the surface of a base material when the water dispersion composition is applied to or coated on the base material, liquid dripping hardly occurs, and the coatability to the base material is excellent, which is preferable.

In the water dispersion composition of the present invention, the average particle size of the dispersed particles of the ethylene α-olefin copolymer acid-modified substance (B) forming the dispersion composition is preferably 100 nm or less, more preferably in a range of 10 to 95 nm, further preferably in a range of 10 to 60 nm, particularly preferably in a range of 20 to 40 nm, and most preferably in a range of 20 to 30 nm. When the average particle size of the dispersed particles is larger than the above range, the particles are easily separated, which is not preferable from the viewpoint of stability. On the other hand, when the average particle size of the dispersed particles is smaller than the above range, the interaction between the particles becomes strong and the viscosity of the water dispersion composition tends to increase, so that spreading of the water dispersion composition on the surface of the base material becomes difficult, which is not preferable. In other words, when the average particle size of the dispersed particles is in the above range, the water dispersion composition is excellent in stability and also excellent in coatability to the base material, which is preferable.

[Method for Measuring Average Particle Size]

The average particle size in the present invention refers to the diameter of the particles at 50% of the cumulative volume when the total volume is 100%, and can be measured by using a dynamic light-scattering particle size distribution measuring apparatus or a Nanotrac particle size distribution measuring apparatus. In the present invention, the average particle size of the particles in the dispersion liquid was measured using Nanotrac WAVE2 EX150 (manufactured by MicrotracBEL Corp.).

Further, that the water dispersion composition in the present invention is excellent in stability means that the dispersion state when the water dispersion composition is stored under a room temperature environment is good.

In the present invention, regarding the stability of the water dispersion composition, the water dispersion composition was placed in a transparent cylindrical glass container 120 mm in length and 40 mm in diameter, allowed to stand at 23° C. for 15 hours, and then visually evaluated for the presence or absence of separation.

In the water dispersion composition of the present invention, the content of water is preferably 50 to 99.99% by mass, preferably 60 to 99.95% by mass.

The water dispersion composition of the present invention may contain a surfactant, a corrosion inhibitor, an antioxidant, an animal and vegetable oil or its fatty acid ester, a synthetic lubricating oil, wax, an inorganic powder, and various other additives, in addition to the ethylene·α-olefin copolymer acid-modified substance (B). The additives may be used singly or in combination of two or more thereof.

Various surfactants such as anionic, cationic and nonionic surfactants can be used as the surfactant. Examples thereof include an alkylene oxide adduct of nonylphenol, an alkylene oxide adduct of a linear higher alcohol having 12 to 18 carbon atoms, an alkylene oxide adduct of a higher amine, a polyoxyethylene adduct of a fatty acid such as castor oil, an alkylene oxide adduct of a fatty acid amide, an alkyl sulfate, a Tamol-type, a tetraalkylammonium salt, and an alkylbetaine. When the surfactant is used, the addition amount thereof in the water dispersion composition is preferably 0.1 to 20% by mass, and more preferably 0.5 to 10% by mass.

Examples of the corrosion inhibitor include sodium nitrite, sodium benzoate, and triethanolamine salt. When the corrosion inhibitor is used, the addition amount thereof in the water dispersion composition is preferably 0.01 to 10% by mass, and more preferably 0.1 to 5% by mass.

Examples of the antioxidant include phenolic and amine-based compounds such as 2,6-di-t-butyl-4-methylphenol. The addition amount of the antioxidant in the water dispersion composition is preferably 0 to 3% by mass.

Examples of the animal or vegetable oil include mineral oil, rapeseed oil, soybean oil, coconut oil, palm oil, beef tallow, and lard. Examples of the synthetic lubricating oil include polyalphaolefin, polybutadiene, polyisobutylene, and various ester oils.

Examples of the wax include synthetic waxes such as polyethylene wax and polypropylene wax, oxides and acid-modified substances of these synthetic waxes, and natural waxes such as carnauba, montane and beeswax, to the extent that their dispersibility in water and adhesion to molds are not deteriorated.

Examples of the inorganic powder include talc, mica, clay, organic clay, boron nitride, mortar, sericite, calcium carbonate, borate, alumina, titanium oxide, sodium bicarbonate, zirconium oxide, graphite, carbon black, and diamond powder.

As other components, silicone compounds such as silicone, dimethylsilicone, alkyl-modified silicone, and alkylaralkyl-modified silicone; extreme pressure agents such as zinc dialkyldithiophosphate (ZnDTP), molybdenum dialkyldithiophosphate (MoDTP), zinc dithiocarbamate (ZnDTC), and molybdenum dithiocarbamate (MoDTC), phosphorus-based extreme pressure agents and sulfur-based extreme pressure agents for reducing friction; antifoaming agents; and preservatives may be used in combination.

<Method for Producing Water Dispersion Composition>

Examples of the method for producing the water dispersion composition of the present invention include a method of emulsifying water, the ethylene·α-olefin copolymer acid-modified substance (B) and the optional additives by a conventional method, for example, by hand or using a stirrer, or using an emulsifying machine such as a homomixer, a colloid mill, a line mixer or a homogenizer. The water temperature during emulsification is preferably 40 to 99° C., and more preferably 50 to 99° C.

When morpholine is used during the preparation of the water dispersion composition of the acid-modified substance (B), the effect of the morpholine reacting with the polar group of the acid-modified substance (B) to stabilize the water dispersion composition is obtained. Morpholine may be added during the preparation of the water dispersion composition, or may be mixed with the acid-modified substance (B) in advance and reacted. Morpholine is preferably added in an amount of 1 to 50 parts by mass, more preferably 1 to 30 parts by mass, and particularly preferably 2 to 20 parts by mass, based on 100 parts by mass of the acid-modified substance (B).

In the present invention, by using, as the ethylene·α-olefin copolymer acid-modified substance (B), an ethylene·α-olefin copolymer acid-modified substance (B) having any acid value, apparent viscosity at 150° C., weight-average molecular weight, molecular weight distribution, weight fraction of unreacted molecules, and weight fraction of unreacted molecules having a molecular weight higher than the weight-average molecular weight of the ethylene·α-olefin copolymer acid-modified substance (B) among unreacted molecules, the stability, viscosity, and average particle size of the water dispersion composition can be adjusted without changing the equipment and conditions for emulsification.

In particular, the method using the ethylene·α-olefin copolymer acid-modified substance (B) having an adjusted weight fraction of unreacted molecules and an adjusted weight fraction of unreacted molecules having a molecular weight higher than the weight-average molecular weight of the ethylene·α-olefin copolymer acid-modified substance (B) among unreacted molecules, is preferable as a method for producing a water dispersion composition having stability, viscosity and average particle diameter suitable for various applications because the stability, viscosity and average particle size of the water dispersion composition can be adjusted without changing the total amount of polar groups, molecular weight and molecular weight distribution in the ethylene·α-olefin copolymer acid-modified substance (B), which tends to, for example, make the change of the property small when the water dispersion composition is applied to or coated on, then dried.

<Applications>

The water dispersion composition of the present invention has no particular limitation of application and can be used for, for example, various resin or rubber polymer modifiers, modification aids, softeners, gel modifiers, latex modifiers, other water-soluble resin modifiers, emulsification aids such as emulsion polymerization aids, lubricating oil additives, viscoadhesives, dispersants, dispersion aids, printing inks, printing pastes, lacquers, inks, coating agents for food packaging materials, coating agents for flooring materials, coating agents for shoes, coating agents for automobiles, and other aqueous coating materials, finishing agents for paper-making, spinning, and textile, metal working oils such as cutting oil and drawing oil, various mold release agents for die casting, various modifiers such as heat sealing agent and cosmetics, modification aids, inks, paints, coating materials, and adhesives. The water dispersion composition of the present invention, when used as a heat sealing agent, can ensure good adhesion to a base material and is excellent in dispersibility in water, and therefore can be particularly suitably used as a heat sealing agent.

EXAMPLES

Hereinafter the present invention will be described in detail with reference to Examples, but the present invention is not limited to these Examples.

[Evaluation Method]

In the following Examples and Comparative Examples, physical properties and the like of the ethylene·α-olefin copolymer (A), the acid-modified ethylene·α-olefin copolymer (B) and the water dispersion composition were measured by the following methods.

<<Physical Properties of Ethylene·α-Olefin Copolymer (A)>>

<Ethylene Unit Content (Mol %) (A1)>

Using a Fourier transform infrared spectrometer FT/IR-610 or FT/IR-6100 (manufactured by JASCO), absorbance ratio of absorption in the vicinity of 721 $cm^{-1}$ based on the horizontal vibration of the long chain methylene group, and absorption in the vicinity of 1155 $cm^{-1}$ based on the skeletal vibration of propylene (D1155 $cm^{-1}$/D721 $cm^{-1}$) was calculated, and ethylene unit content (% by mass) was obtained by using calibration curve created beforehand (created using the ASTM D3900 reference sample). Using the ethylene unit content (% by mass) thus obtained, ethylene unit content (mol %) was obtained according to the following Formula.

[Math. 2]

$$\text{Ethylene unit content(mol \%)} = \frac{[\text{Ethylene unit content (\% by mass)} \div 28]}{[\text{Ethylene unit content (\% by mass)} \div 28] + [\text{Propylene unit content (\% by mass)} \div 42]}$$

<Viscosity Properties (A2)>

Kinematic viscosity at 100° C. was measured and calculated by the method described in JIS K2283. Apparent viscosity (Brookfield viscosity) at 150° C. was measured and calculated by the method described in JIS K7117-1.

<Molecular Weight (A3) and Molecular Weight Distribution (A4)>

Molecular weight and molecular weight distribution were measured by using HLC-8320GPC manufactured by Tosoh Corporation as follows. TSK gel Super Multipore HZ-M (4 columns) are used as a separation column, the column temperature was set to 40° C., tetrahydrofuran (Wako Pure Chemical Corporation) was used as a mobile phase, the development speed was 0.35 mL/minute, the sample concentration was 5.5 g/L, the amount of injection of sample was 20 μl, and a differential reflectometer was used as a detector. PStQuick MP-M manufactured by Tosoh Corporation was used as the standard polystyrene. Weight-average molecular weight (Mw) and number-average molecular weight (Mn) are calculated according to general calibration in terms of molecular weight of polystyrene, and the molecular weight distribution (Mw/Mn) is calculated from those values.

<B-value (A5)>

Using o-dichlorobenzene/benzene-d6 (4/1 [vol/vol %]) as a measurement solvent, 13C-NMR spectrum was measured under measurement conditions of a measurement temperature of 120° C., a spectral bandwidth of 250 ppm, a pulse repetition time of 5.5 seconds, and a pulse width of 4.7 usec (45° pulse) (100 MHz, ECX400P, JEOL Ltd.), or under measurement conditions of a measurement temperature of 120° C., a spectral bandwidth of 250 ppm, a pulse repetition time of 5.5 #seconds, and a pulse width of 5.0 μsec (45° pulse) (125 MHz, Bruker BioSpin AVANCE III cryo-500), and B-value was calculated based on the following formula [1]. The assignment of peaks was carried out with reference to the publicly known documents as mentioned above.

[Math. 3]

$$B = \frac{P_{OE}}{2P_O \cdot P_E} \quad [1]$$

In the formula [1], $P_E$ represents a molar fraction of ethylene units, $P_O$ represents a molar fraction of α-olefin units, and $P_{OE}$ represents a molar fraction of ethylene·α-olefin chains in all dyad chains.

<Unsaturated Bond Amount (A6)>

Using o-dichlorobenzene-$d_4$ as a measurement solvent, $^1$H-NMR spectrum (400 MHz, ECX400P, JEOL Ltd.) was measured under measurement conditions of a measurement temperature of 120° C., a spectral bandwidth of 20 ppm, a pulse repetition time of 7.0 seconds, and a pulse width of 6.15 μsec (45° pulse).

Using the solvent peak (ortho-dichlorobenzene 7.1 ppm) as the chemical shift standard, the amount of unsaturated bonds per 1000 carbon atoms (bonds/1000C) was calculated from the ratio of the integral value of the main peak observed at 0 to 3 ppm and the peak derived from the unsaturated bond observed at 4 to 6 ppm.

<Melting Point>

Using X-DSC-7000 manufactured by Seiko Instruments Inc., a sample of about 8 mg of the copolymer was placed in a simple airtight aluminum sample pan in a DSC cell, and the DSC cell was heated at a rate of 10° C./min from room temperature to 150° C. under a nitrogen atmosphere, then held at 150° C. for 5 minutes, and then cooled at a rate of 10° C./min to cool the DSC cell to −100° C. (cooling process). Then, after holding at −100° C. for 5 minutes, the temperature was raised at a rate of 10° C./min, and the temperature at which the enthalpy curve obtained during the warming process shows the maximum value was taken as the melting point (Tm), and the sum of heat absorption accompanying melting was taken as the heat of fusion (ΔH). When no peak was observed or the value of the heat of fusion (ΔH) was 1 J/g or less, the melting point (Tm) was considered not to be observed. The melting point (Tm) and heat of fusion (ΔH) were determined based on JIS K7121.

<<Physical Properties of Ethylene·α-Olefin Copolymer Acid-Modified Substance (B)>>

<Acid Value (B1)>

A precisely weighed sample of the copolymer was dissolved in a mixed solvent of mixed xylene: n-butanol=1:1 in mass ratio, to give a sample solution. Then, the sample solution was titrated with a precedently standardized N/10 potassium hydroxide solution in alcohol (obtained by adding 5 g of ion-exchanged water to 7 g of special grade potassium hydroxide, adding 1st grade ethyl alcohol to the resultant to give a volume of 1 L (liter), and standardizing the titer F by using N/10 hydrochloric acid and 1% phenolphthalein solution), and the acid value was calculated based on the resultant neutralization amount in accordance with the following formula:

Acid value(mgKOH/g)=($N$/10KOH titration amount (ml)×F×5.61)/(sample (g)×0.01)

<Apparent Viscosity (B2)>

Apparent viscosity (Brookfield viscosity) at 150° C. was measured and calculated by the method described in JIS K7117-1.

<Molecular Weight (B3) and Molecular Weight Distribution (B4)>

Molecular weight and molecular weight distribution were measured by using HLC-8320GPC manufactured by Tosoh Corporation as follows. TSK gel Super Multipore HZ-M (4 columns) were used as a separation column, the column temperature was set to 40° C., tetrahydrofuran (Wako Pure Chemical Corporation) was used as a mobile phase, the development speed was 0.35 mL/minute, the sample concentration was 5.5 g/L, the amount of injection of sample was 20 μl, and a differential reflectometer was used as a detector. PStQuick MP-M manufactured by Tosoh Corporation was used as the standard polystyrene. Weight-average molecular weight (Mw) and number-average molecular weight (Mn) were calculated according to general calibration in terms of the molecular weight of polystyrene, and molecular weight distribution (Mw/Mn) was calculated from those values.

<Weight Fraction of Unreacted Molecules (B5)>

Weight fraction of the unreacted molecules was measured as follows using an HPLC apparatus (Alliance e2695 Separations Module/2414 RI Detector) manufactured by Waters Corporation.

Mobile phase: hexane
Flow rate: 1 ml/min
Sample concentration: 1 w/v %
Sample injection amount: 20 μL
Column: normal phase column manufactured by Agilent Technologies, Inc.
Column size: internal diameter 4.6 mm, length 250 mm
Column filler: silica particles (particle size 5 μm)
Detector: Differential refractometer In the Examples of the present invention, the ethylene·α-olefin copolymers used in the production of the ethylene·α-olefin copolymer acid-modified substance (B) are used as specimens, and the weight fraction is specified by the following formula from the values of the peak areas (So) (appearing in the region of 2 to 3.5 minutes) when the specimens are measured under the above conditions and the peak areas ($S_{MD}$) at the same positions in the measurement results of the respective samples.

weight fraction of unreacted molecules=100×$S_{MD}/S_0$

<Weight Fraction (B6) of Unreacted Molecules Having Molecular Weight Higher than Weight-Average Molecular Weight of ethylene·α-Olefin Copolymer Acid-Modified Substance (B) Among Unreacted Molecules Contained in Ethylene·α-Olefin Copolymer Acid-Modified Substance (B)>

Molecular weight of the unreacted molecules contained in the ethylene·α-olefin copolymer acid-modified substance (B) was determined by fractionating the unreacted molecules with a silica column and measuring their molecular weight by gel permeation chromatography (GPC). The unreacted molecules were fractionated by filling crushed silica gel (Wakogel C-300, manufactured by Wako Pure Chemical Corporation) to a height of 5 cm in a chromatographic tube having a diameter of 50 mm, impregnating the silica gel with hexane, sequentially adding, in order, a solution obtained by dissolving 1 g of the ethylene·α-olefin copolymer acid-modified substance (B) in 5 mL of hexane and 20 mL of hexane from the top of the chromatographic tube, and collecting and drying about 10 mL of the solution eluted from the lower part of the chromatographic tube. Molecular weights of the fractionated unreacted molecules were measured using HLC-8320GPC manufactured by Tosoh Corporation as follows, and weight fraction of the unreacted molecules having a molecular weight higher than the weight-average molecular weight of the ethylene·α-olefin copolymer acid-modified substance (B) was calculated. TSK gel Super Multipore HZ-M (4 columns) were used as a separation column, the column temperature was set to 40° C., tetrahydrofuran (Wako Pure Chemical Corporation) was used as a mobile phase, the development speed was 0.35 mL/minute, the sample concentration was 5.5 g/L, the amount of injection of sample was 20 μl, and a differential reflectometer was used as a detector. PStQuick MP-M manufactured by Tosoh Corporation was used as the standard polystyrene.

Production Example of Ethylene·α-Olefin Copolymer (A)

The ethylene·α-olefin copolymer (A) was produced according to the following Polymerization Examples. The obtained ethylene·α-olefin copolymer (A) was subjected to a hydrogenation operation by the following method, if necessary.

<Hydrogenation Operation>

A 1 L internal volume stainless steel autoclave was loaded with 100 mL of a 0.5% by mass hexane solution of a Pd/alumina catalyst and 500 mL of a 30% by mass hexane solution of the ethylene·α-olefin copolymer, and the autoclave was tightly closed and was purged with nitrogen. Next, the temperature was raised to 140° C. under stirring, the inside of the system was purged with hydrogen, thereafter the pressure was increased to 1.5 MPa with hydrogen, and hydrogenation reaction was performed for 15 minutes.

<Synthesis of Metallocene Compound>

Synthesis Example 1

Synthesis of [methylphenylmethylene(η5-cyclopentadienyl) (η5-2,7-di-t-butylfluorenyl)]zirconium dichloride

(i) Synthesis of 6-methyl-6-phenylfulvene

Under a nitrogen atmosphere, 7.3 g (101.6 mmol) of lithium cyclopentadiene and 100 mL of dehydrated tetrahydrofuran were added to a 200 mL three-necked flask and stirred. The resultant solution was cooled in an ice bath, and to the solution was added 15.0 g (111.8 mmol) of acetophenone dropwise. Thereafter, the resultant mixture was stirred at room temperature for 20 hours to give a solution and the solution was quenched with an aqueous diluted hydrochloric acid solution. To extract soluble components, 100 mL of hexane was added, and the organic layer was washed with water and saturated brine, and then dried over anhydrous magnesium sulfate. Thereafter, the solvent was distilled off, and the obtained viscous liquid was separated by column chromatography (hexane), to give a target product (red viscous liquid).

(ii) Synthesis of methyl(cyclopentadienyl) (2,7-di-t-butylfluorenyl) (phenyl)methane Under a nitrogen atmosphere, 2.01 g (7.20 mmol) of 2,7-di-t-butylfluorene and 50 mL of dehydrated t-butyl methyl ether were added to a 100 mL three-necked flask. While performing cooling in an ice bath, 4.60 mL (7.59 mmol) of an n-butyllithium/hexane solution (1.65 M) was added gradually, and the resultant mixture was stirred at room temperature for 16 hours. Further, 1.66 g (9.85 mmol) of 6-methyl-6-phenylfulvene was added, and the resultant mixture was stirred for 1 hour while performing heating under reflux. While performing cooling in an ice bath, 50 mL of water was added gradually, and the obtained two-layer solution was transferred to a 200 mL separatory funnel. After 50 mL of diethyl ether had been added, the funnel was shaken several times and the aqueous layer was removed, and the organic layer was washed with 50 mL of water three times and with 50 mL of saturated brine one time. After drying over anhydrous magnesium sulfate for 30 minutes, the solvent was distilled off under reduced pressure. Ultrasonic waves were applied to a solution obtained by adding a small amount of hexane to precipitate a solid, and the solid was recovered and washed with a small amount of hexane. The solid was dried under reduced pressure, to give 2.83 g of methyl(cyclopentadienyl) (2,7-di-t-butylfluorenyl) (phenyl)methane as a white solid.

(iii) Synthesis of [methylphenylmethylene(η5-cyclopentadienyl) (η5-2,7-di-t-butylfluorenyl)]zirconium dichloride Under a nitrogen atmosphere, 1.50 g (3.36 mmol) of methyl(cyclopentadienyl) (2,7-di-t-butylfluorenyl) (phenyl) methane, 50 mL of dehydrated toluene, and 570 μL (7.03 mmol) of THF (tetrahydrofuran) were sequentially added to a 100 mL Schlenk tube. While performing cooling in an ice bath, 4.20 mL (6.93 mmol) of an n-butyllithium/hexane solution (1.65 M) was added gradually, and the resultant mixture was stirred at 45° C. for 5 hours. The solvent was distilled off under reduced pressure, and 40 mL of dehydrated diethyl ether was added, to give a red solution. While performing cooling in a methanol/dry ice bath, 728 mg (3.12 mmol) of zirconium tetrachloride was added, and the resultant mixture was stirred for 16 hours while gradually raising the temperature to room temperature, giving a reddish orange slurry. The solvent was distilled off under reduced pressure, and the obtained solid was brought into a glove box, washed with hexane, and then extracted with dichloromethane. After the solvent was distilled off under reduced pressure for concentration, a small amount of hexane was added, and the mixture was allowed to stand at −20° C. to precipitate a reddish orange solid. This solid was washed with a small amount of hexane and was dried under reduced pressure, thereby giving 1.20 g of [methylphenylmethylene (η5-cyclopentadienyl) (η5-2,7-di-t-butylfluorenyl)]zirconium dichloride as a reddish orange solid.

Synthesis Example 2

Synthesis of [ethylene(η5-cyclopentadienyl) (η5-2,7-di-t-butylfluorenyl)]zirconium dichloride

[Ethylene (η5-cyclopentadienyl) (η5-2,7-di-t-butylfluorenyl)]zirconium dichloride was synthesized by the method described in Japanese Patent No. 4367687.

Polymerization Example 1

Into a 2 L internal volume stainless steel autoclave which had been thoroughly purged with nitrogen, 760 ml of heptane and 120 g of propylene were charged, the temperature of the system was raised to 150° C., and thereafter 0.85 MPa of hydrogen and 0.19 MPa of ethylene were supplied to allow the total pressure to be 3 MPaG. Next, 0.4 mmol of triisobutylaluminum, 0.0002 mmol of [methylphenylmethylene(η5-cyclopentadienyl) (η5-2,7-di-t-butylfluorenyl)] zirconium dichloride, and 0.002 mmol of N,N-dimethylanilinium tetrakis(pentafluorophenyl)borate were injected with nitrogen, and a resultant mixture was stirred at a rotational speed of 400 rpm, to allow polymerization to start. Thereafter, only ethylene was continuously supplied to keep the total pressure at 3 MPaG, and the polymerization was carried out at 150° C. for 5 minutes. The polymerization was terminated by addition of a small amount of ethanol into the system, and thereafter unreacted ethylene, propylene and hydrogen were purged. The obtained polymer solution was washed with 1000 ml of 0.2 mol/l hydrochloric acid three times and then with 1000 ml of distilled water three times, dried over magnesium sulfate, and then the solvent was distilled off under reduced pressure. The obtained polymer was dried at 80° C. under reduced pressure for 10 hours, to give 60.9 g of an ethylene·propylene copolymer. Further, this ethylene·propylene copolymer was subjected to a hydrogenation operation.

The above operations provided an ethylene·propylene copolymer (A-1) described in Table 1. The analysis results of the obtained ethylene·propylene copolymer (A-1) are shown in Table 1.

Polymerization Example 2

Into a 2 L internal volume stainless steel autoclave which had been thoroughly purged with nitrogen, 710 mL of heptane and 145 g of propylene were charged, the temperature of the system was raised to 150° C., and thereafter 0.40 MPa of hydrogen and 0.27 MPa of ethylene were supplied to allow the total pressure to be 3 MPaG. Next, 0.4 mmol of triisobutylaluminum, 0.0001 mmol of [methylphenylmethylene(η5-cyclopentadienyl) (η5-2,7-di-t-butylfluorenyl)] zirconium dichloride, and 0.001 mmol of N,N-dimethylanilinium tetrakis(pentafluorophenyl)borate were injected with nitrogen, and a resultant mixture was stirred at a rotational speed of 400 rpm, to allow polymerization to start. Thereafter, only ethylene was continuously supplied to keep the total pressure at 3 MPaG, and the polymerization was carried out at 150° C. for 5 minutes. The polymerization was terminated by addition of a small amount of ethanol into the system, and thereafter unreacted ethylene, propylene and hydrogen were purged. The obtained polymer solution was washed with 1000 mL of 0.2 mol/l hydrochloric acid three times and then with 1000 mL of distilled water three times, dried over magnesium sulfate, and then the solvent was distilled off under reduced pressure. The obtained polymer was dried overnight under reduced pressure at 80° C., to give 52.2 g of an ethylene·propylene copolymer. Further, this ethylene·propylene copolymer was subjected to a hydrogenation operation.

The above operations provided an ethylene·propylene copolymer (A-3) described in Table 1. The analysis results of the obtained ethylene·propylene copolymer (A-3) are shown in Table 1.

In addition, ethylene·propylene copolymers (A-2), (A-4), and (A-5) obtained by a method using a vanadium catalyst comprising a vanadium compound and an organoaluminum compound in the same manner as described in JP1990-1163B and JP1990-7998B were used in Examples. The analysis results of the ethylene·propylene copolymers (A-2), (A-4), and (A-5) used are shown in Table 1.

Production Example 1

An ethylene·propylene copolymer (A-6) was obtained by mixing 95.5% by mass of the ethylene·propylene copolymer (A-1) and 4.5% by mass of the ethylene·propylene copolymer (A-3). The analysis results of the obtained ethylene·propylene copolymer (A-6) are shown in Table 1.

Production Example 2

An ethylene·propylene copolymer (A-7) was obtained by mixing 94.3% by weight of the ethylene·propylene copolymer (A-2) and 5.7% by weight of the ethylene·propylene copolymer (A-4). The analysis results of the obtained ethylene·propylene copolymer (A-7) are shown in Table 1.

Production Example 3

An ethylene·propylene copolymer (A-8) was obtained by mixing 91.4% by weight of the ethylene·propylene copolymer (A-2), 4.3% by weight of the ethylene·propylene copolymer (A-4), and 4.3% by weight of the ethylene·propylene copolymer (A-5). The analysis results of the obtained ethylene·propylene copolymer (A-8) are shown in Table 1.

TABLE 1

| | Ethylene•propylene copolymer No. | Ethylene content mol % | 100° C. kinematic viscosity $mm^2/s$ | Mw | Mw/Mn | B-value | Amount of unsaturated bonds bonds/1000 C | Melting point ° C. |
|---|---|---|---|---|---|---|---|---|
| Polymerization Example 1 | A-1 | 48 | 151 | 5,170 | 1.7 | 1.2 | <0.1 | n.d. |
| Polymerization Example 4 | A-2 | 48.5 | 148 | 5,050 | 1.7 | 1.2 | <0.1 | n.d. |
| Polymerization Example 2 | A-3 | 53.2 | 588 | 8,490 | 1.8 | 1.2 | <0.1 | n.d. |
| Polymerization Example 5 | A-4 | 53.1 | 603 | 8,530 | 1.8 | 1.2 | <0.1 | n.d. |
| Polymerization Example 3 | A-5 | 48 | 100 | 4,520 | 1.6 | 1.2 | <0.1 | n.d. |
| Production Example 1 | A-6 | 48.2 | 171 | 5,320 | 1.7 | 1.2 | <0.1 | n.d. |
| Production Example 2 | A-7 | 48.8 | 168 | 5,250 | 1.7 | 1.2 | <0.1 | n.d. |
| Production Example 3 | A-8 | 48.2 | 161 | 5,210 | 1.7 | 1.2 | <0.1 | n.d. |

[Production of Ethylene·α-Olefin Copolymer Acid-Modified Substance (B)]

Using the ethylene·propylene copolymers (A-6) to (A-8) shown in Table 1, graft modification with the graft component was performed.

<Basic Operation for Producing Olefin Polymer Composition>

Any one of the ethylene·propylene copolymers (A-6) to (A-8) was placed in a reaction apparatus equipped with a stirrer, mounted with a nitrogen blowing tube, a water cooling condenser, a thermometer, a maleic anhydride supply device, and a radical generator supply device, the temperature was raised, nitrogen was introduced into the reaction apparatus at 120° C. to purge oxygen in the system, and then the inside of the system was kept maintained at 160° C. Thereafter, Wako Special Grade maleic anhydride (manufactured by FUJIFILM Wako Pure Chemical Corporation, about 70° C.: liquid) and di-t-butyl peroxide perbutyl D (manufactured by NOF Corporation) were supplied to the reaction apparatus for a predetermined time at a predetermined speed under a predetermined stirring speed, and after completion of the supply, the inside of the reaction apparatus was further maintained at 160° C. for 1 hour, and stirring was continued. Next, the temperature in the reaction apparatus was further raised to 175° C., the pressure in the system was released, and then unnecessary components (for example, unreacted maleic anhydride, decomposition product of di-t-butyl peroxide) were removed under reduced pressure and a nitrogen stream.

Modification Examples 1 to 10

The ethylene·propylene copolymer acid-modified substances (B-1) to (B-10) were produced under various production conditions disclosed in Table 2 in accordance with the basic operation for producing the olefin polymer composition. Results are shown in Table 2.

Production Example 4

An ethylene·propylene copolymer acid-modified substance (B-11) was obtained by uniformly mixing 95% by mass of the ethylene·propylene copolymer acid-modified substance (B-7) and 5% by mass of the ethylene·propylene copolymer (A-6). The analysis results of the obtained ethylene·propylene copolymer acid-modified substance (B-11) are shown in Table 3.

Production Example 5

An ethylene·propylene copolymer acid-modified substance (B-12) was obtained by uniformly mixing 95% by mass of the ethylene·propylene copolymer acid-modified substance (B-7) and 5% by mass of the ethylene·propylene copolymer (A-3). The analysis results of the obtained ethylene·propylene copolymer acid-modified substance (B-12) are shown in Table 3.

Production Example 6

An ethylene·propylene copolymer acid-modified substance (B-13) was obtained by uniformly mixing 80% by mass of the ethylene·propylene copolymer acid-modified substance (B-1) and 20% by mass of the ethylenepropylene copolymer (A-6) The analysis results of the obtained ethylene·propylene copolymer acid-modified substance (B-13) are shown in Table 3.

TABLE 2

| | Ethylene•propylene copolymer acid-modified substance No. | Production conditions | | | | | |
|---|---|---|---|---|---|---|---|
| | | Ethylene•propylene copolymer No. | Ethylene•propylene copolymer blending amount | maleic anhydride blending amount | di-t-butyl peroxide blending amount | addition time h | stirring speed rpm |
| Modification Example 1 | B-1 | A-6 | 280 g | 16 g | 3 g | 1 | 450 |
| Modification Example 2 | B-2 | A-6 | 280 g | 16 g | 3 g | 5 | 450 |
| Modification Example 3 | B-3 | A-6 | 280 g | 16 g | 3 g | 1.5 | 300 |
| Modification Example 4 | B-4 | A-6 | 280 g | 16 g | 3 g | 5 | 300 |
| Modification Example 5 | B-5 | A-7 | 2805 kg | 163 kg | 33 kg | 2.5 | 60 |
| Modification Example 6 | B-6 | A-7 | 2805 kg | 163 kg | 33 kg | 3.5 | 60 |
| Modification Example 7 | B-7 | A-8 | 2805 kg | 163 kg | 33 kg | 5 | 60 |
| Modification Example 8 | B-8 | A-6 | 1870 g | 108 g | 22 g | 2.5 | 300 |
| Modification Example 9 | B-9 | A-6 | 550 g | 42 g | 8 g | 3 | 800 |
| Modification Example 10 | B-10 | A-6 | 1831 g | 140 g | 28 g | 3 | 300 |

| | Analysis results of ethylene•propylene copolymer acid-modified substance | | | | | |
|---|---|---|---|---|---|---|
| | acid value mgKOH/g | apparent viscosity (150° C.) cPs | Mw — | Mw/Mn — | weight fraction of unreacted molecules % | proportion of high molecular weight components in unreacted molecules % |
| Modification Example 1 | 53 | 83 | 5,410 | 1.8 | 59 | 19.8 |
| Modification Example 2 | 59 | 70 | 5,760 | 1.9 | 46 | 15.8 |
| Modification Example 3 | 57 | 75 | 5,410 | 1.8 | 58 | 18.9 |
| Modification Example 4 | 57 | 70 | 5,820 | 1.9 | 49 | 16.5 |
| Modification Example 5 | 58 | 74 | 5,630 | 1.8 | 54 | 18.5 |
| Modification Example 6 | 59 | 75 | 5,650 | 1.8 | 51 | 17.8 |
| Modification Example 7 | 59 | 67 | 5,610 | 1.9 | 45 | 15.7 |

TABLE 2-continued

| | | | | | | |
|---|---|---|---|---|---|---|
| Modification Example 8 | 58 | 81 | 5,910 | 1.9 | 51 | 18.2 |
| Modification Example 9 | 53 | 74 | 5,060 | 1.7 | 67 | 19.8 |
| Modification Example 10 | 76 | 105 | 6,040 | 2.0 | 44 | — |

TABLE 3

| | | Quality of ethylene•propylene copolymer acid-modified substance (B) | | | | | |
|---|---|---|---|---|---|---|---|
| | Ethylene•propylene copolymer acid-modified substance No. | acid value mgKOH/g | apparent viscosity (150° C.) cPs | Mw — | Mw/Mn — | weight fraction of unreacted molecules % | proportion of high molecular weight components in unreacted molecules % |
| Production Example 4 | B-11 | 57 | 69 | 5,580 | 1.9 | 48 | 17.1 |
| Production Example 5 | B-12 | 57 | 73 | 5,730 | 1.9 | 48 | 20.3 |
| Production Example 6 | B-13 | 60 | 84 | 5,810 | 1.9 | 55 | 21.1 |

<Water Dispersion Composition>

Example 1

Into a 500 mL round-bottomed flask equipped with a stirrer, 41.6 g of the ethylene·propylene copolymer acid-modified substance (B-1) and 10.4 g of polyoxyethylene alkyl ether EMULGEN 1108 (manufactured by Kao Corporation) were placed, and the temperature was raised to 96° C. while stirring at a stirring speed of 50 rpm. Next, a mixed solution of 7.5 g of morpholine Cica first grade (manufactured by Kanto Chemical Co., Inc.) and 10.0 g of pure water was added, and the resultant mixture was reacted for 30 minutes at a stirring speed of 250 rpm. Subsequently, a hot water 134 g at 97° C. was added, and the resultant mixture was stirred at a stirring speed of 500 rpm for 60 minutes, and then allowed to cool at the stirring speed of 250 rpm for 30 minutes, to give a water dispersion composition. The stability, viscosity, and average particle size of the obtained water dispersion composition were evaluated according to the following methods. The analysis results of the obtained water dispersion composition are shown in Table 4.

Examples 2 to 10

A water dispersion composition was obtained in the same manner as in Example 1, except that the contents of the obtained ethylene·propylene copolymer acid-modified substance used in Example 1 were changed to those shown in Table 4. The analysis results of the obtained water dispersion composition are shown in Table 4.

Comparative Examples 1 and 2

A water dispersion composition was obtained in the same manner as in Example 1, except that the contents of the obtained ethylene·propylene copolymer acid-modified substance used in Example 1 were changed to those shown in Table 4. The stability of the obtained water dispersion composition was evaluated, and the viscosity and average particle size could not be measured because separation occurred.

[Stability of Water Dispersion Composition]

Regarding the stability of the water dispersion composition, the water dispersion composition was placed in a transparent cylindrical glass container 120 mm in length and 40 mm in diameter, allowed to stand at 23° C. for 15 hours, and then visually observed and evaluated for the presence or absence of separation. When the turbidity state of the water dispersion composition in the glass container was uniform, it was evaluated as no separation, and when a difference in the turbidity state was observed in the height direction, it was evaluated as separation.

[Viscosity of Water Dispersion Composition]

The viscosity of the water dispersion composition was measured at 23° C. using a B-type viscosity meter TVB-10M (manufactured by TOKI SANGYO). For the measurement, the samples evaluated for the stability of the water dispersion composition were used as is.

[Average Particle Size of Water Dispersion Composition]

The average particle size of the water dispersion composition was measured using Nanotrac WAVE2 EX150 (manufactured by MicrotracBEL Corp.). For the measurement, 1 g of the water dispersion composition was drawn from the sample evaluated for the stability into a polypropylene cup and diluted with 10 g of pure water. From the obtained measurement results, the diameter of the particles at 50% of the cumulative volume when the total volume is 100% was taken as the average particle size.

TABLE 4

| | Ethylene•propylene copolymer acid-modified substance No. | Analysis results of water dispersion composition stability — | viscosity mPa · s | average particle size nm |
|---|---|---|---|---|
| Example 1 | B-1 | no separation | 18 | 98 |
| Example 2 | B-2 | no separation | 85 | 25 |
| Example 3 | B-3 | no separation | 21 | 62 |
| Example 4 | B-4 | no separation | 67 | 29 |
| Example 5 | B-5 | no separation | 35 | 41 |
| Example 6 | B-6 | no separation | 48 | 35 |
| Example 7 | B-7 | no separation | 113 | 25 |
| Example 8 | B-8 | no separation | 45 | 42 |
| Comparative Example 1 | B-9 | separation | — | — |
| Example 9 | B-11 | no separation | 83 | 27 |
| Example 10 | B-12 | separation | — | — |
| Comparative Example 2 | B-13 | separation | — | — |

When the water dispersion compositions of Examples 1 to 10 are compared with those of Comparative Examples 1 and 2, it can be seen that the water dispersion composition using the ethylene·propylene copolymer acid-modified substance having a low weight fraction of unreacted molecules is excellent in stability. Further, it can also be seen that the water dispersion composition using the ethylene·propylene copolymer acid-modified substance having a small proportion of high molecular weight components in the unreacted molecules, is excellent in stability. Further, among Examples 1 to 10, the water dispersion composition using the ethylene·propylene copolymer acid-modified substance having a low weight fraction of unreacted molecules and having a small proportion of high molecular weight components in the unreacted molecules is more preferable because the water dispersion composition is more excellent in stability due to small average particle size and high viscosity and is excellent in adhesiveness when the water dispersion composition is applied to a base material, and thus good base material coatability such as excellent adhesiveness and less dripping can be expected.

INDUSTRIAL APPLICABILITY

The water dispersion composition, the method for producing the water dispersion composition, and the ethylene·α-olefin copolymer acid-modified substance of the present invention provide a water dispersion excellent in stability and excellent in coatability to the base material, and thus can be used for, for example, various resin or rubber polymer modifiers, modification aids, softeners, gel modifiers, latex modifiers, other water-soluble resin modifiers, emulsification aids such as emulsion polymerization aids, lubricating oil additives, viscoadhesives, dispersants, dispersion aids, printing inks, printing pastes, lacquers, inks, coating agents for food packaging materials, coating agents for flooring materials, coating agents for shoes, coating agents for automobiles, and other aqueous coating materials, finishing agents for papermaking, spinning, and textile, metal working oils such as cutting oil and drawing oil, various mold release agents such as mold release agents for die casting, various modifiers such as heat sealing agent and cosmetics, modification aids, inks, paints, coating materials, and adhesives. Of these, these are particularly suitable for applications in heat sealing agents due to its excellent stability and excellent coatability to the base material.

The invention claimed is:

1. A water dispersion composition comprising an ethylene·α-olefin copolymer acid-modified substance (B) in a range of 0.01 to 50% by mass, wherein the ethylene·α-olefin copolymer acid-modified substance (B) is an acid-modified substance of an ethylene·α-olefin copolymer (A) satisfying the following (A1) to (A6), and satisfies the following (B1) to (B6):

(A1) having a content of ethylene units in a range of 30 to 85 mol %;

(A2) having a kinematic viscosity at 100° C. in a range of 10 to 5,000 $mm^2/s$;

(A3) having a weight-average molecular weight, as measured by gel permeation chromatography (GPC) and calculated in terms of polystyrene, being in a range of 1,000 to 50,000;

(A4) having a molecular weight distribution (Mw/Mn) for molecular weight measured by gel permeation chromatography (GPC) and calculated in terms of polystyrene, being 2.5 or less;

(A5) having a B-value represented by the following formula [1] of 1.1 or more,

[Math. 1]

$$B = \frac{P_{OE}}{2P_O \cdot P_E} \quad [1]$$

wherein $P_E$ represents a molar fraction of ethylene units, $P_O$ represents a molar fraction of α-olefin units, and $P_{OE}$ represents a molar fraction of ethylene·α-olefin chains in all dyad chains;

(A6) having an amount of unsaturated bonds, as measured by $^1$H-NMR, being less than 0.5 per 1000 carbon atoms;

(B1) having an acid value in a range of 1 to 300 mgKOH/g;

(B2) having an apparent viscosity at 150° C. in a range of 1 to 1,000 cPs;

(B3) having a weight-average molecular weight, as measured by gel permeation chromatography (GPC) and calculated in terms of polystyrene, being in a range of 1,000 to 50,000;

(B4) having a molecular weight distribution (Mw/Mn) for molecular weight measured by gel permeation chromatography (GPC) and calculated in terms of polystyrene, being 2.5 or less;

(B5) having a weight fraction of unreacted molecules, as measured by high performance liquid chromatography (HPLC), being 54% or less;

(B6) having a weight fraction of 18.5% or less, the weight fraction being a weight fraction of unreacted molecules having a molecular weight higher than the weight-average molecular weight of the acid-modified substance (B), as measured by gel permeation chromatography (GPC) and calculated in terms of polystyrene, among unreacted molecules contained in the acid-modified substance (B).

2. The water dispersion composition according to claim 1, wherein the acid-modified substance (B) is a copolymer obtained by modifying the ethylene·α-olefin copolymer (A) with at least one selected from maleic acid and maleic anhydride.

3. The water dispersion composition according to claim 1, wherein the water dispersion composition has a viscosity of 15 mPa·s or more.

4. The water dispersion composition according to claim 1, wherein dispersed particles of the ethylene·α-olefin copolymer acid-modified substance (B) forming the water dispersion composition have an average particle size of 100 nm or less.

5. A method for producing the water dispersion composition according to claim 1, the method comprising emulsifying water and the ethylene·α-olefin copolymer acid-modified substance (B).

6. An ethylene·α-olefin copolymer acid-modified substance (B) that is an acid-modified substance of an ethylene·α-olefin copolymer (A) satisfying the following (A1) to (A6), and that satisfies the following (B1) to (B6):

(A1) having a content of ethylene units in a range of 30 to 85 mol %;

(A2) having a kinematic viscosity at 100° C. in a range of 10 to 5,000 $mm^2/s$;

(A3) having a weight-average molecular weight, as measured by gel permeation chromatography (GPC) and calculated in terms of polystyrene, being in a range of 1,000 to 50,000;

(A4) having a molecular weight distribution (Mw/Mn) for molecular weight measured by gel permeation chromatography (GPC) and calculated in terms of polystyrene, being 2.5 or less;

(A5) having a B-value represented by the following formula [1] of 1.1 or more,

[Math. 1]

$$B = \frac{P_{OE}}{2P_O \cdot P_E} \quad [1]$$

wherein $P_E$ represents a molar fraction of ethylene units, $P_O$ represents a molar fraction of α-olefin units, and $P_{OE}$ represents a molar fraction of ethylene·α-olefin chains in all dyad chains;

(A6) having an amount of unsaturated bonds, as measured by 1H-NMR, of less than 0.5 per 1000 carbon atoms, and (B1) having an acid value in a range of 1 to 300 mgKOH/g;

(B2) having an apparent viscosity at 150° C. in a range of 1 to 1,000 cPs;

(B3) having a weight-average molecular weight, as measured by gel permeation chromatography (GPC) and calculated in terms of polystyrene, being in a range of 1,000 to 50,000;

(B4) having a molecular weight distribution (Mw/Mn) for the molecular weight measured by gel permeation chromatography (GPC) and calculated in terms of polystyrene, being 2.5 or less;

(B5) having a weight fraction of unreacted molecules, as measured by high performance liquid chromatography (HPLC), being 54% or less;

(B6) having a weight fraction of 18.5% or less, the weight fraction being a weight fraction of unreacted molecules having a molecular weight higher than the weight-average molecular weight of the acid-modified substance (B), as measured by gel permeation chromatography (GPC) and calculated in terms of polystyrene, among unreacted molecules contained in the acid-modified substance (B).

7. The ethylene·α-olefin copolymer acid-modified substance (B) according to claim 6, which is a copolymer obtained by modifying the ethylene·α-olefin copolymer (A) with at least one selected from maleic acid and maleic anhydride.

* * * * *